(12) United States Patent
Hori et al.

(10) Patent No.: US 7,219,227 B2
(45) Date of Patent: May 15, 2007

(54) DATA DISTRIBUTION SYSTEM AND RECORDING DEVICE AND DATA PROVISION DEVICE USED THEREFOR

(75) Inventors: Yoshihiro Hori, Gifu (JP); Toshiaki Hioki, Ogaki (JP); Miwa Kanamori, Ogaki (JP); Takatoshi Yoshikawa, Ogaki (JP); Hiroshi Takemura, Aichi (JP); Masataka Takahashi, Ishikawa (JP); Takayuki Hasebe, Kawasaki (JP); Shigeki Furuta, Kawasaki (JP); Takahisa Hatakeyama, Kawasaki (JP); Tadaaki Tonegawa, Kodaira (JP); Takeaki Anazawa, Tokyo (JP)

(73) Assignees: Sanyo Electric Co., Ltd., Osaka (JP); Fujitsu Limited, Kawasaki (JP); Hitachi, Ltd., Tokyo (JP)

( * ) Notice: Subject to any disclaimer, the term of this patent is extended or adjusted under 35 U.S.C. 154(b) by 669 days.

(21) Appl. No.: 10/130,302

(22) PCT Filed: Dec. 1, 2000

(86) PCT No.: PCT/JP00/08497

§ 371 (c)(1),
(2), (4) Date: May 31, 2002

(87) PCT Pub. No.: WO01/41359

PCT Pub. Date: Jun. 7, 2001

(65) Prior Publication Data

US 2002/0184492 A1 Dec. 5, 2002

(30) Foreign Application Priority Data

Dec. 3, 1999 (JP) .................................. 11/345244

(51) Int. Cl.
*H04L 9/00* (2006.01)
*G06F 11/30* (2006.01)

(52) U.S. Cl. ...................... 713/158; 713/155; 713/193; 380/270; 380/277

(58) Field of Classification Search ................ 713/193, 713/169, 156, 171, 158, 176, 155; 380/270, 380/277; 235/380; 705/54, 55, 59; 726/4, 726/26, 29
See application file for complete search history.

(56) References Cited

U.S. PATENT DOCUMENTS 5,225,664 A * 7/1993 Iijima .......................... 235/380

(Continued)

FOREIGN PATENT DOCUMENTS

EP 0 996 074 A1 4/2000

(Continued)

OTHER PUBLICATIONS

Digital Transmission Content Protection Specification, vol. 1, Revision 1.0, Apr. 12, 1999. See PCT search report.
Kiyoshi Yamanaka et al; NTT R&D, vol. 44, 9, pp. 813-818. 1995.

*Primary Examiner*—Nasser Moazzami
*Assistant Examiner*—Santo M Z Abedin
(74) *Attorney, Agent, or Firm*—Westerman, Hattori, Daniels & Adrian, L.L.P.

(57) ABSTRACT

A license server (10) includes a CRL database (306) holding a revocation list recording therein classes predetermined corresponding respectively to a memory device, such as a memory card, and a content reproduction circuit, such as a cellular phone, that are subjected to revocation of distributing, reproducing and transferring content data. A distribution control unit (315) suspends an operation distributing content data if the distribution is addressed to a class listed on the revocation list. The revocation list is also held in the memory card and distribution control unit (315) in distributing content also transmits information for updating the revocation list in the memory card.

23 Claims, 25 Drawing Sheets

U.S. PATENT DOCUMENTS

| | | | | |
|---|---|---|---|---|
| 5,371,794 | A | * | 12/1994 | Diffie et al. ................ 713/156 |
| 5,784,464 | A | * | 7/1998 | Akiyama et al. ........... 713/155 |
| 5,845,281 | A | * | 12/1998 | Benson et al. ................ 707/9 |
| 6,092,201 | A | * | 7/2000 | Turnbull et al. ................ 726/4 |
| 6,097,817 | A | * | 8/2000 | Bilgic et al. ................ 380/270 |
| 6,128,740 | A | * | 10/2000 | Curry et al. ................ 713/158 |
| 6,247,127 | B1 | * | 6/2001 | Vandergeest ................ 713/100 |
| 6,421,779 | B1 | * | 7/2002 | Kuroda et al. ............. 713/169 |
| 6,915,434 | B1 | * | 7/2005 | Kuroda et al. ............. 713/193 |

FOREIGN PATENT DOCUMENTS

| | | |
|---|---|---|
| JP | 6-326786 | 11/1994 |
| JP | 10-222063 | 8/1998 |
| JP | 11-328850 | 11/1999 |
| JP | 2000-357127 | 12/2000 |

\* cited by examiner

FIG.2

| NAME | ATTRIBUTE | HELD/PRODUCED AT | FUNCTION & CHARACTERISTIC |
|---|---|---|---|
| Data | CONTENT DATA | | E.G., MUSIC DATA |
| Kc | LICENSE KEY | | KEY FOR DECRYPTING ENCRYPTED CONTENT DATA |
| {Data}Kc | ENCRYPTED CONTENT DATA | | CONTENT DATA ENCRYPTED DECRYPTABLE WITH SYMMETRIC KEY Kc. DISTRIBUTED IN THIS FORM FROM DISTRIBUTION SERVER |
| Data-inf | ADDITIONAL INFORMATION | | E.G., PLAINTEXT INFORMATION FOR EXAMPLE ON COPYRIGHT OF CONTENT DATA OR RELATED TO SERVER ACCESS |
| CONTENT ID | INFORMATION ON CONTENT | DISTRIBUTION SERVER | CODE FOR IDENTIFYING CONTENT DATA Data |
| LICENSE ID | INFORMATION OF LICENSE | | MANAGEMENT CODE CAPABLE OF SPECIFYING ISSUANCE OF LICENSE (ALSO CAPABLE OF IDENTIFYING IT INCLUDING CONTENT ID) |
| AC | LICENSE PURCHASING CONDITION | | DESIGNATED BY USER (E.G., THE NUMBER OF LICENSES, LIMITATION OF FUNCTION) |
| AC1 | ACCESS RESTRICTION INFORMATION | | RESTRICTION ON MEMORY ACCESS (E.G., NO. OF TIMES OF REPRODUCTION ALLOWED) |
| AC2 | REPRODUCTION CIRCUIT CONTROL INFORMATION | | CONTROL INFORMATION IN CONTENT REPRODUCTION CIRCUIT (CELLULAR PHONE) (E.G., WHETHER REPRODUCTION IS ALLOWED /DISALLOWED) |

FIG.3

| NAME | ATTRIBUTE | HELD/PRODUCED AT | FUNCTION & CHARACTERISTIC |
|---|---|---|---|
| CRL | INFORMATION OF CLASS REVOCATION LIST | DISTRIBUTION SERVER MEMORY CARD | DATA OF CLASSES IN CLASS REVOCATION LIST |
| CRL_dat | | DISTRIBUTION SERVER | INFORMATION FOR UPDATING THE VERSION OF CLASS REVOCATION LIST (IN THE FORM OF DIFFERENTIAL DATA) |
| CRL_ver | | MEMORY CARD | INFORMATION OF VERSION OF CLASS REVOCATION LIST |
| KPp(n) | PUBLIC ENCRYPTION KEY (ASYMMETRIC KEY) | CELLULAR PHONE | DECRYPTABLE WITH Kp(n). RECORDED IN THE FORM OF {KPp(n)//Cp(n)}Pma WHEN SHIPPED. *HAS DIFFERENT INFORMATION FOR EACH CELLULAR PHONE CLASS (n). |
| KPmc(m) | PUBLIC ENCRYPTION KEY (ASYMMETRIC KEY) | MEMORY CARD | DECRYPTABLE WITH Kmc. RECORDED IN THE FORM OF {KPmc(m)//Cmc(m)}KPma WHEN SHIPPED. *HAS DIFFERENT INFORMATION FOR EACH MEMORY CARD CLASS (m). |
| Kp(n) | PRIVATE DECRYPTION KEY | CELLULAR PHONE | DECRYPTION KEY UNIQUE TO CONTENT REPRODUCTION CIRCUIT (CELLULAR PHONE). *HAS DIFFERENT INFORMATION FOR EACH CELLULAR PHONE CLASS (n). |
| Kmc(m) | PRIVATE DECRYPTION KEY | MEMORY CARD | DECRYPTION KEY UNIQUE TO MEMORY CARD. *HAS DIFFERENT INFORMATION FOR EACH MEMORY CARD CLASS (m). |
| Cp(n) | CLASS CERTIFICATE | CELLULAR PHONE | CCONTENT REPRODUCTION CIRCUIT CLASS CERTIFICATE. HAS AUTHENTICATION FUNCTION. RECORDED IN THE FORM OF {KPp(n)//Cp(n)}KPma WHEN SHIPPED. *HAS DIFFERENT INFORMATION FOR EACH CELLULAR PHONE CLASS(n) |
| Cmc(m) | | MEMORY CARD | MEMORY CARD CLASS CERTIFICATE. HAS AUTHENTICATION FUNCTION. RECORDED IN THE FORM OF {KPmc(n)//Cmc(m)}KPma WHEN SHIPPED. *HAS DIFFERENT INFORMATION FOR EACH MEMORY CARD CLASS (n). |

FIG.4

| NAME | ATTRIBUTE | HELD/PRODUCED AT | FUNCTION & CHARACTERISTIC |
|---|---|---|---|
| Ks1 | SYMMETRIC KEY (UNIQUE TO SESSION) | DISTRIBUTION SERVER | GENERATED FOR EACH DISTRIBUTION SESSION |
| Ks2 | | MEMORY CARD | GENERATED FOR EACH DISTRIBUTION/TRANSFER (RECEPTION) SESSION |
| Ks3 | | MEMORY CARD | GENERATED FOR EACH REPRODUCTION/TRANSFER (TRANSMISSION) SESSION |
| Ks4 | | CELLULAR PHONE | GENERATED FOR EACH REPRODUCTION SESSION |
| Km(i) | PRIVATE DECRYPTION KEY | MEMORY CARD | DECRYPTION KEY UNIQUE TO MEMORY CARD (i). DATA ENCRYPTED WITH KPm(i) IS DECRYPTABLE WITH Km(i). |
| KPm(i) | PUBLIC ENCRYPTION KEY (ASYMMETRIC KEY) | MEMORY CARD | ENCRYPTION KEY UNIQUE TO MEMORY CARD (i) |
| KPma | AUTHENTICATION KEY (PUBLIC DECRYPTION KEY) | DISTRIBUTION SERVER | SHARED THROUGHOUT THE DISTRIBUTION SYSTEM. |
| Kcom | SECRET COMMON KEY | CELLULAR PHONE DISTRIBUTION SERVER | SECRET KEY SHARED BY REPRODUCTION CIRCUITS. FOR USE IN ENCRYPTING AND DECRYPTING Kc, AC2. (APPLICABLE IN ANY SYMMETRIC KEY CRYPTOSYSTEM & PUBLIC_KEY CRYPTOSYSTEM) |

FIG.20

| NAME | ATTRIBUTE | HELD/PRODUCED AT | FUNCTION & CHARACTERISTIC |
|---|---|---|---|
| Ks1 | SYMMETRIC KEY (UNIQUE TO SESSION) | DISTRIBUTION SERVER | GENERATED FOR EACH DISTRIBUTION SESSION |
| Ks2 | | MEMORY CARD | GENERATED FOR EACH DISTRIBUTION/TRANSFER (RECEPTION) SESSION |
| Ks3 | | MEMORY CARD | GENERATED FOR EACH DISTRIBUTION/TRANSFER (TRANSMISSION) SESSION |
| Ks4 | | CELLULAR PHONE | GENERATED FOR EACH REPRODUCTION SESSION |
| Km(i) | PRIVATE DECRYPTION KEY | MEMORY CARD | DECRYPTION KEY UNIQUE TO MEMORY CARD (i). DATA ENCRYPTED WITH KPm(i) IS DECRYPTABLE WITH Km(i). |
| KPm(i) | PUBLIC ENCRYPTION KEY (ASYMMETRIC KEY) | MEMORY CARD | ENCRYPTION KEY UNIQUE TO MEMORY CARD (i) |
| KPma | PUBLIC DECRYPTION KEY | DISTRIBUTION SERVER | SHARED THROUGHOUT THE DISTRIBUTION SYSTEM. |
| Kcom | SECRET COMMON KEY | CELLULAR PHONE | SECRET KEY SHARED BY REPRODUCTION CIRCUITS. FOR USE IN ENCRYPTING AND DECRYPTING Kc, AC2. |
| K(i) | SYMMETRIC KEY | MEMORY CARD | SYMMETRIC KEY UNIQUE TO EACH MEMORY CARD. (i) IS AN ARGUMENT IDENTIFYING A MEMORY CARD, THUS CAPABLE OF RAPID DECRYPTION |

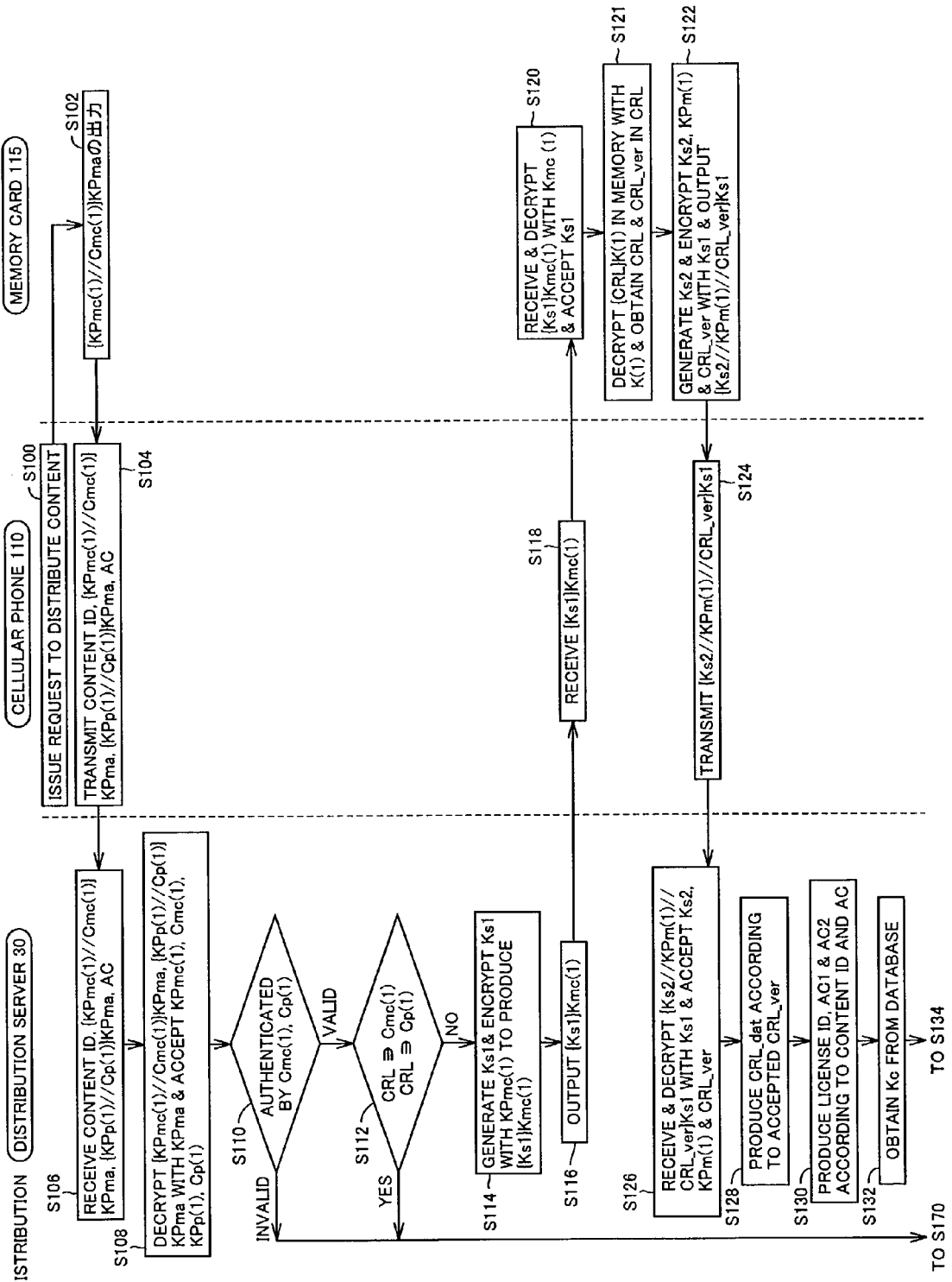

DATA DISTRIBUTION SYSTEM AND RECORDING DEVICE AND DATA PROVISION DEVICE USED THEREFOR

BACKGROUND OF THE INVENTION

1. Field of the Invention

The present invention relates generally to data distribution systems for distributing information to a terminal such as a cellular phone and particularly to data distribution systems capable of protecting a copyright for copied information and memory cards for use in the systems.

2. Description of Related Art

In recent years the Internet and other similar information communication networks have advanced and a cellular phone or the like is used for a personal terminal to allow the user to readily access network information.

On such an information communication network a digital signal is used to transmit information. As such, if a user copies music, video data or the like transmitted on such an information communication network as described above, each individual user can copy such data almost free of significant degradation in the quality of sound, image and the like.

Thus, if music data, image data or other similar content data in copyright is transmitted on such an information communication network without any appropriate approach taken to protect the copyright, the copyright owner may have his/her right infringed significantly.

However, prioritizing copyright protection and preventing content data distribution on a rapidly expanding digital information communication work, is disadvantageous to copyright owners, who basically can collect a predetermined copyright fee for copying content data.

In contrast, if digital data recorded in a recording medium, e.g., music data recorded in a normally sold compact disc (CD), is copied to a magneto-optical disk (such as an MD), it may be copied, as desired, as long as the copied data is solely for personal use, although an individual user who example digitally records data is required to indirectly pay as a bond to the copyright owner a predetermined portion of the price of the exact digital recording equipment, MD or any other similar media used by the user.

In addition, if music data in a digital signal is copied from a CD to an MD the information is digital data copied without significant degradation and accordingly equipment is configured to prevent copying data from a recordable MD to another MD and thus protect copyright.

As such, distributing music data, image data and other similar data to the public on a digital information communication network is itself a behavior subject to a restriction attributed to a public transmission right of a copyright owner and a sufficient approach is accordingly required for protection of copyright.

This requires preventing further, arbitrarily copying content data that has been transmitted to the public on an information communication network and received.

SUMMARY OF THE INVENTION

One object of the present invention is to provide a data distribution system capable of distributing content data on an information communication network for example of cellular phones, and a recording device for use in the data distribution system, more specifically a memory card.

Another object of the present invention is to provide a data distribution system capable of preventing distributed content data from being replicated without permission of the copyright owner, and a recording device for use in the data distribution system, more specifically a memory card.

In accordance with the present invention a data distribution system includes a plurality of terminals and a content provision device. Each terminal has a first interface unit provided to communicate data externally, and a distributed-data deciphering unit receiving and recording at least a license key. The deciphering unit has a first authentication data hold unit holding first class certification data determined corresponding to the deciphering unit and encrypted in a state authenticatable when it is decrypted with an authentication key, for output via the first interface unit when the license key is received, and a first storage unit provided to record encrypted content data and the license key therein. The content provision device has a second interface unit provided to communicate data externally, a first authentication unit receiving via the second interface unit the first class certification data encrypted in a state capable of verifying authenticity when it is decrypted with an authentication key, for decryption with the authentication key to confirm the authenticity, a class revocation list hold unit holding a class revocation list listing the first class certification data subjected to revocation of distribution, and a distribution control unit suspending at least a distribution operation distributing a content key to each terminal having the deciphering unit if the first authentication unit obtains the first class certification data listed in the class revocation list held in the class revocation list hold unit.

Preferably each terminal further has a content reproduction unit. The content reproduction unit has a content data reproduction unit receiving a license key and encrypted content data from the deciphering unit and using the license key to decrypt and reproduce the encrypted content data, and a second authentication data hold unit holding second class certification data predetermined to correspond to the content reproduction unit and encrypted in a state capable of verifying authenticity when it is decrypted with an authentication key, and the first authentication unit receives the second class certification data from the second interface unit for decryption. The class revocation list held in the class revocation list hold unit further lists the second class certification data subjected to revocation. In a distribution operation each terminal outputs encrypted second class certification data to the second interface unit via the first interface unit. The distribution control unit suspends at least the distribution operation distributing the content key to each terminal, if the class revocation list held in the class revocation list hold unit includes the second class certification data input via the second interface unit and decrypted by the first authentication unit.

The present invention in another aspect provides a data provision device provided to distribute encrypted content data and a license key serving as a decryption key decrypting the encrypted content data to obtain plaintext content data or the license key alone to a plurality of terminals each having a data recording unit holding first class certification data determined to correspond to the data recording unit and encrypted in a state authenticatable through decryption with an authentication key, including: an interface unit; an authentication unit; a class revocation list hold unit; and a distribution control unit. The interface unit externally communicates data. The authentication unit receives via the interface unit the first class certification data encrypted in a state capable of verifying authenticity through decryption with the authentication key, for decryption with the authentication key to confirm the authenticity. The class revocation list hold unit holds a class revocation list listing the first class certification data subjected to revocation of the distribution. The distribution control unit suspends at least a distribution operation distributing the license key to each terminal having the data recording unit, if the first authentication unit obtains the first class certification data listed on the class revocation list held in the class revocation list hold unit.

The present invention in still another aspects provides a data provision device distributing encrypted content data and a license key decrypting the encrypted content data to obtain plaintext content data or the license key alone to a plurality of terminals each having a data recording unit holding first class certification data determined to correspond to the data recording unit and encrypted in a state authenticatable through decryption with an authentication key, including: an interface unit; an authentication unit; a class revocation list hold unit; a distribution control unit; a first session key generation unit; a session key encryption unit; a session key decryption unit; a first license data encryption unit; and a second license data encryption unit. The interface unit externally communicates data. The authentication unit receives via the interface unit the first class certification data and a first public encryption key transmitted from each terminal and encrypted in a state authenticatable through decryption with the authentication key, for decryption with the authentication key to confirm authenticity. The class revocation list hold unit holds a class revocation list listing the first class certification data subjected to revocation of distributing the license key. The distribution control unit suspends a distribution operation distributing first reproduction information at least including the license key to a terminal corresponding to a source of the first class certification data received, if the first authentication unit obtains the first class certification data listed on the class revocation list held in the class revocation list hold unit. The first session key generation unit generates a first symmetric key updated whenever the distribution is effected. The session key encryption unit effects an encryption process using the first public encryption key to encrypt the first symmetric key for transmission via the interface unit to a terminal corresponding to a source of the first class certification data received. The session key decryption unit decrypts and extracts a second public encryption key and a second symmetric key encrypted with the first symmetric key and returned via the interface unit from a terminal corresponding to a source of the first class certification data received. The first license data encryption unit encrypts the license key with the second public encryption key decrypted by the session key decryption unit. The second license data encryption unit effects an encryption process using the second symmetric key decrypted by the session key decryption unit, to further encrypt an output of the first license data encryption unit for distribution via the interface unit to a terminal corresponding to a source of the first class certification data received.

The present invention in still another aspect provides a data provision device distributing encrypted content data and a license key serving as a decryption key decrypting the encrypted content data to obtain plaintext content data or the license key alone to a plurality of terminals each having a data recording unit holding class certification data determined to correspond to the data recording unit and encrypted in a state authenticatable through decryption with an authentication key, including: an interface unit; an authentication unit; a class permission list hold unit; and a distribution control unit. The interface unit externally communicates data. The authentication unit receives via the interface unit the class certification data encrypted in a state capable of verifying authenticity through decryption with the authentication key, for decryption with the authentication key to confirm the authenticity. The class permission list hold unit holds a class permission list listing the class certification data subjected to permission to distribute the encrypted content data. The distribution control unit effects at least a distribution operation distributing the license key, if the authentication unit obtains the class certification data listed on the class permission list held in the class permission list hold unit.

In the present data distribution system and data provision device when a distribution operation is to be effected a class of at least one of the distributed-data deciphering unit (a memory card) and the content reproduction unit (a cellular phone) can be confirmed to revoke or permit the distribution operation for each class. This can for example prevent the distribution operation for a class with a key unique thereto broken. Consequently, only users having a recording device, a reproduction device or other similar devices authenticated, capable of protecting copyright can receive content data, stores it in the memory card and decrypts and uses it and the copyright owner can thus be free from improper exploitation attributed to endlessly copying the data.

Furthermore the present invention in still another aspect provides a recording device including a first storage unit, an authentication unit, a second storage unit and a control unit. The first storage unit records data therein. The authentication unit receives first class certification data input via an interface unit, and decrypts the data with an authentication key to confirm authenticity, the first class certification data being encrypted in a state authenticatable when it is decrypted with the authentication key provided from a source of the data received. The second storage unit holds a class revocation list listing the first class certification data subjected to revocation of outputting data. The control unit receives an external instruction to output data and responsively issues an instruction to output the data via the interface unit. The control unit suspends outputting data to a source of the first class certification data received, if the first class certification data input externally via the interface unit together with the external instruction and obtained from the authentication unit decrypting the encrypted first class certification data, is on the class revocation list.

Preferably the recording device further has an authentication data hold unit holding the second class certification data predetermined to correspond to the recording device and encrypted in a state decryptable with an authentication key. In a storage operation recording in the first storage unit data input and received via the interface, the authentication data hold unit responds to an external instruction issued to output the second class certification data, by outputting via the interface unit the second class certification data held in the authentication data hold unit.

The present invention in still another aspect provides a recording device including a first storage unit, an authentication unit, a second storage unit, and a control unit. The first storage unit records data therein. The authentication unit receives class certification data input via an interface unit and encrypted in a state authenticatable through decryption using an authentication key, for decryption with the authentication key to confirm authenticity. The second storage unit holds a class permission list listing class certification data subjected to permission to output the data. The control unit is operative in response to an external instruction issued to output the data, to control outputting the data via the interface unit, and the control unit effects outputting the data if the class permission list includes the class certification data obtained from the authentication unit decrypting the class certification data encrypted and input externally via the interface unit together with the external instruction.

In the present recording device when a license key or similar data is to be input/output a class of the data's destination or recording device itself can be confirmed to revoke or permit the input/output operation for each class. This can for example prevent inputting/outputting data for a class with a key unique thereto broken. Consequently, only authentic users having an authentic recording device, reproduction device or other similar device capable of protecting copyright, can receive data, store it in the recording device and decrypts and uses it and the copyright owner can also be free from improper exploitation attributed to endlessly copying the data.

BRIEF DESCRIPTION OF THE DRAWINGS

FIG. 2 is a list of characteristics of data, information and the like used in a data distribution system of a first embodiment for communication.

FIG. 3 is a list of characteristics of data, information and the like used in the data distribution system of the first embodiment for authentication and operating a revocation class list.

FIG. 4 is a list of characteristics of keys relating to encryption in the data distribution system of the first embodiment.

FIG. 20 is a list of key data and the like used in the data distribution system according to the third embodiment.

FIGS. 21 and 22 are first and second flow charts, respectively, for illustrating a distribution operation in the data distribution system according to the third embodiment.

DETAILED DESCRIPTION OF THE INVENTION

Figure 1:
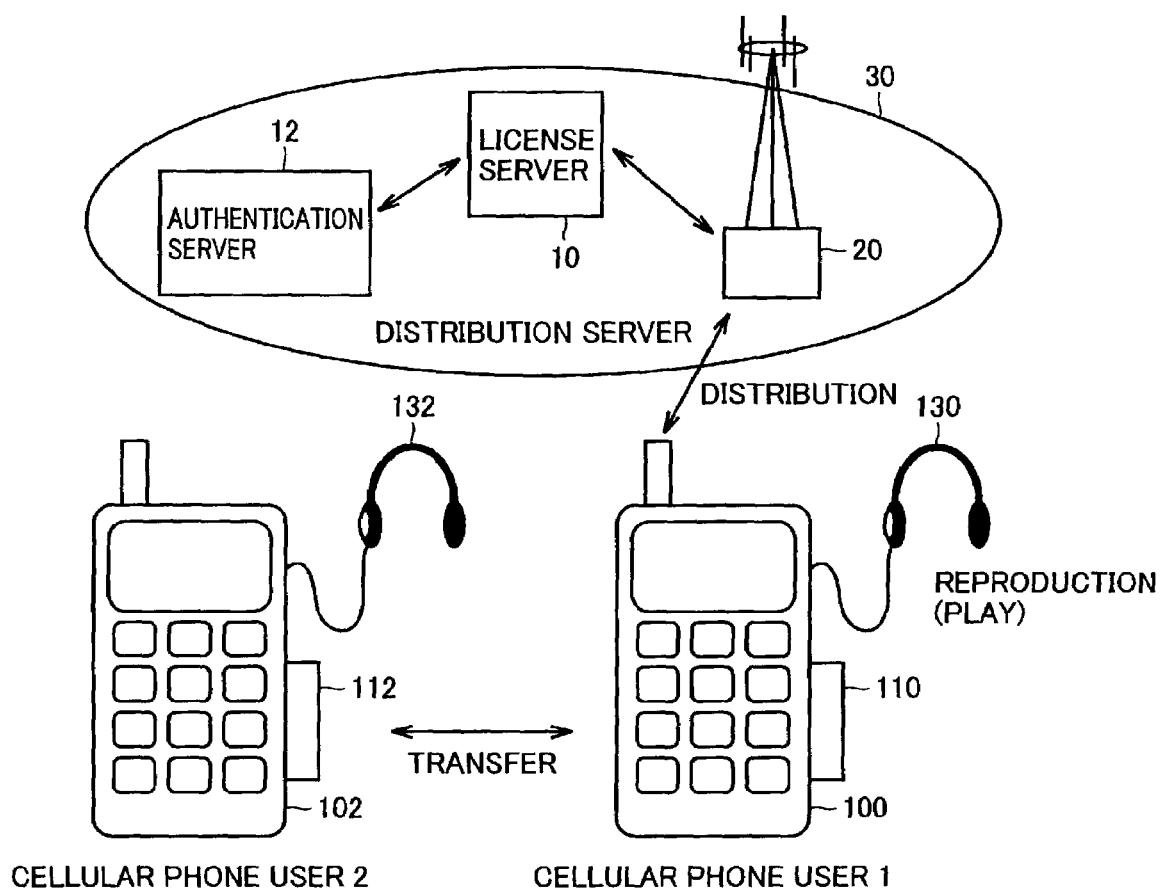
FIG. 1 is a conceptual diagram for illustrating a general configuration of a data distribution system of the present invention.

Hereinafter, the data distribution system in the embodiments of the present invention and the recording device used in the system, more specifically, a memory card, will now be described in detail with reference to the drawings. In the figures, like components are denoted by like reference characters and thus will not be described repeatedly.

In the embodiments of the present invention, a configuration of a data distribution system distributing digital music data to each cellular phone user on a cellular phone network will be described by way of example, although, as will be apparent from the following description, the present invention is not limited thereto and also applicable to distributing other content data, such as that of image information, via other information communication networks.

First Embodiment

With reference to FIG. 1, music data in copyright is managed in a license server 10 using a predetermined encryption system to encrypt music data, (hereinafter also referred to as "content data") and feeding such encrypted content data to a cellular phone company corresponding to a distribution carrier 20 for distributing data. An authentication server 12 determines whether a cellular phone, a memory card or the like of a cellular phone user accessing for distribution of music data is authentic equipment.

Distribution carrier 20 receives a distribution request from each cellular phone user and relays it via its cellular phone network to license server 10. License server 10, in response to the distribution request, confirms through authentication server 12 that the cellular phone user is using an authentic cellular phone, memory card and the like and license server 10 further encrypts the requested content data and distributes the encrypted content data via the cellular phone network of distribution carrier 20 to the cellular phone of the cellular phone user.

In FIG. 1, for example a cellular phone user 1 uses a cellular phone 100 with a detachable memory card 110 attached thereto. Memory card 110 receives the encrypted content data received by cellular phone 10 and, in connection with the above described distribution operation, decrypts the encryption and provides the decryption to a music reproduction unit (not shown) provided in cellular phone 100.

Furthermore for example cellular phone user 1 can "reproduce" such content data via a headphone 130 connected to cellular phone 100 and listen to the same.

Hereinafter, such license server 10, authentication server 12 and distribution carrier 20 will generally be referred to as a distribution server 30.

Furthermore, a process of transmitting content data from distribution server 30 for example to each cellular phone will be referred to as "distribution."

As such, first of all, if memory card 110 is not used, content data distributed by distribution server 30 can hardly be received or reproduced as music.

Furthermore, if whenever distribution carrier 20 distributes the content data of a single piece of music the distribution frequency increments and whenever a cellular phone user receives or downloads the content data a copyright fee incurs and it is collected by distribution carrier 20 together with the phone toll of the cellular phone, the copyright owner can readily collect the copyright fee.

Furthermore such distribution of content data is also advantageous as it is provided in a closed system in a form of a cellular phone network, which facilitates developing an approach for copyright protection, as compared with an open system such as the Internet.

In this context, for example a cellular phone user 2 having a memory card 112 can directly receive with his/her cellular phone 102 content data distributed from distribution server 30. If cellular phone user 2 receives directly from distribution server 30 content data or the like having a significant amount of information, however, the data reception may require a relatively long period of time. It would be more convenient for user 2 if the user can copy the content data from cellular phone user 1 having already received the content data distributed from distribution server 30.

As shown in FIG. 1, copying content data from cellular phone user 1 to the cellular phone user 2 equipment together with the exact content data and the information required for allowing the content data to be reproducible, will be referred to as a "transfer" of the content data. In the transfer, encrypted content data (music data) and the information required for reproduction (reproduction information) are transferred between memory cards 110 and 112 via cellular phones 100 and 102. Herein, the "reproduction information," as will be described hereinafter, has a license key capable of decrypting content data encrypted in a predetermined encryption system, and limit information on license ID, access reproduction and the like corresponding to the information relating to copyright protection, and other similar information.

Thus, once content data distributed from distribution server 30 is received, it can be used on the receiving side flexibly.

Furthermore, if cellular phones 100 and 102 are personal handy phones (PHSs), they allow communications in the so-called transceiver mode and such a function can thus be used to transfer information between cellular phone users 1 and 2.

In the FIG. 1 configuration, to allow encrypted and distributed content data to be reproduced on the side of a cellular phone user, a system is initially required to be a system for distributing an encryption key in a communication, secondly the exact system encrypting content data to be distributed, and thirdly a configuration implementing content data protection for preventing such distributed content data from being copied without permission.

In the present embodiment, in particular when any of distribution, reproduction and transfer sessions occurs, whether or not the content data's destination is an authentic destination is determined and checked severely and for any recording devices and content reproduction circuits (cellular phones) that are not authenticated or are with a decryption key broken the system can prevent outputting the content data thereto and thus enhance protection of the copyright of the content data.

FIG. 2 is a list of characteristics of data, information and the like used in the FIG. 1 data distribution system for a communication.

Initially, data distributed from a distribution server will be described. "Data" is content data such as music data. Content data Data is encrypted, decryptable with a license key Kc. It is encrypted with license key Kc to be encrypted content data {Data} Kc which is in turn distributed from distribution server 30 to a cellular phone user.

Note that hereinafter, a representation {Y} X will refer to data Y encrypted decryptable with a decryption key X.

Furthermore, the distribution server distributes together with the encrypted content data additional information Data-inf corresponding to plaintext information on content data or server access. Furthermore, as the reproduction information, there exist, other than license key Kc, a content ID serving as a code for identifying content data Data and a license ID serving as a management code capable of specifying an issuance of a license, and access restriction information AC1 and reproduction circuit control information AC2 generated from license purchasing condition AC including a number of licenses, a limitation on a function and other similar information that are determined as designated by a user. Access restriction information AC1 is information on a limitation imposed on memory access and reproduction circuit control information AC2 is control information in a reproduction circuit. Note that a license ID, a content ID and access control information AC1 will generally be referred to as license information and that the license information, license key Kc and reproduction circuit control information AC2 will also generally be referred to as reproduction information.

Reference will now be made to FIG. 3 to describe characteristics of data, information and the like used in a data distribution system of the first embodiment for an authentication and operating a revocation class list.

In the present embodiment the class revocation list (CRL) is used to revoke content data distribution, reproduction and transfer for each recording device (memory card) and each content reproduction circuit (cellular phone) class. Hereinafter, CRL will also represent data in the class revocation list, as required.

Information related to the class revocation list includes CRL data listing classes of content reproduction circuits and memory cards that are revoked from receiving, reproducing and transferring a distributed license.

CRL data is managed in the distribution server and also recorded and thus held in a memory card. Such a class revocation list needs to be upgraded, as appropriate, to update data. To change the data, the distribution server generates differential data CRL_dat basically reflecting only the changed portion(s) of the data and CRL in the memory card is rewritten accordingly. Furthermore, the version of the class revocation list is managed by the distribution server, which receives and confirms CRL_ver output from the memory card. Rather than the version of the class revocation list, time information of the list, such as a date and time when the list was updated, can alternatively be used to similarly manage the list.

Thus CRL can be held and managed not only in a distribution server and also in a memory card to revoke distributing a license key to a content reproduction circuit and memory card with a decryption key unique to the class, or a decryption key unique to the type of the content reproduction circuit and memory card, broken. Thus the content reproduction circuit cannot reproduce content data and the memory card cannot transfer content data.

Thus, CRL in a memory card is configured to have data updated successively when distribution is effected. Furthermore in a memory circuit CRL is managed for example by recording it in a memory card at a tamper resistant module independently of the upper level(s) to prevent CRL data from being improperly changed from the upper level(s) by means for example of file systems, application programs and the like. Thus, protection of copyright of data can further be enhanced.

A content reproduction circuit (a cellular phone) and a memory card are provided with public encryption keys KPp(n) and KPmc(m), respectively, unique to their classes. Public encryption keys KPp(n) and KPmc(m) are decryptable with a private decryption key Kp(n) unique to the class of the content reproduction circuit (the cellular phone) and a private decryption key Kmc(m) unique to the class of the memory card, respectively. The "class" is herein a unit sharing public encryption key KPmc(m) or KPp(n) and distinguished for example by manufacturer, type, manufacturing lot, and the like. These public encryption and private decryption keys each have a different value for each cellular phone class and each memory card class.

Furthermore, there are also provided class certificates Cp(n) and Cmc(m) for a memory card and a reproduction circuit, respectively, wherein a natural number m represents a number for distinguishing a class of the memory card and a natural number n represents a number for distinguishing a class of the reproduction circuit. These class certificates have different information for each memory card class and each content reproduction unit (cellular phone) class. If a class with an encryption by means of a public encryption key unique to the class broken, i.e., a class with a private decryption key unique to the class leaked, is listed on the class revocation list and thus prevented from license issuance.

The public encryption keys and class certificates unique to the memory card and the content reproduction unit are recorded in a memory card and a cellular phone in the form of authentication data {KPmc(m)//Cmc(m)}KPma and {KPp(n)//Cp(n)}KPma, respectively, when they are shipped. KPma represents an authentication key shared throughout a distribution system. When authentication key KPma is used to decrypt authentication data, a result of decrypting the data can be used to verify the authenticity of the authentication data. In other words, authentication key KPma is a key used to approve a public encryption key unique to a class and a class certificate serving as a certificate thereof. Note that authentication data is created through an encryption process using an asymmetric private key paired with the authentication key.

Reference will now be made to FIG. 4 to collectively describe characteristics of keys relating to an encryption process in the FIG. 1 data distribution system.

When a memory card externally communicates data, encryption keys Ks1–Ks4 are used to keep the secret. Keys Ks1–Ks4 are symmetric keys generated by server 30, cellular phone 100 or 102, memory card 110 or 112 whenever content data is distributed, reproduced and transferred.

Herein, symmetric keys Ks1–Ks4 are unique symmetric keys generated for each "session" corresponding to a unit of communication or a unit of access between a server, a cellular phones and a memory cards and hereinafter will also be referred to as "session keys."

Session keys Ks1–Ks4 each have a unique value for each communication session and thus managed by a distribution server, a cellular phone and a memory card. More specifically, session key Ks1 is generated by the distribution server for each distribution session. Session key Ks2 is generated by the memory card for each distribution session and each transfer (on a receiving side) session, and session key Ks3 is generated similarly in the memory card for each reproduction session and each transfer (on a transmitting side) session. Session key Ks4 is generated in the cellular phone for each reproduction session. In each session, these session keys can be communicated at a session key generated by other equipment can be received and used to effect encryption and a license key and the like can then be transmitted to enhance security in the session.

Furthermore, as a key for managing a data-processing in memory card 100, there exist a public encryption key KPm (i) set for each medium corresponding to a memory card and a private decryption key Km (i) each unique each memory card and capable of decrypting data encrypted with public encryption key KPm (i), wherein i represents a natural number. Herein, natural number i represents a number provided to distinguish each memory card.

Furthermore, as a common secret key in a system there exists a secret key Kcom in a symmetric-key cryptosystem used mainly to obtain license key Kc. Secret key Kcom is held in both of a distribution server and a cellular phone and used to encrypt license key Kc and decrypt and thus obtain the same, respectively.

Note that secret key Kcom in the symmetric-key cryptosystem may be replaced by a set of public encryption key Kpcom and private decryption key Kcom in a public-key cryptosystem. In this case, public encryption key Kpcom is held in a distribution server and used to encrypt license key Kc and private decryption key Kcom is held in a cellular phone and used to obtain license key Kc.

Figure 5:
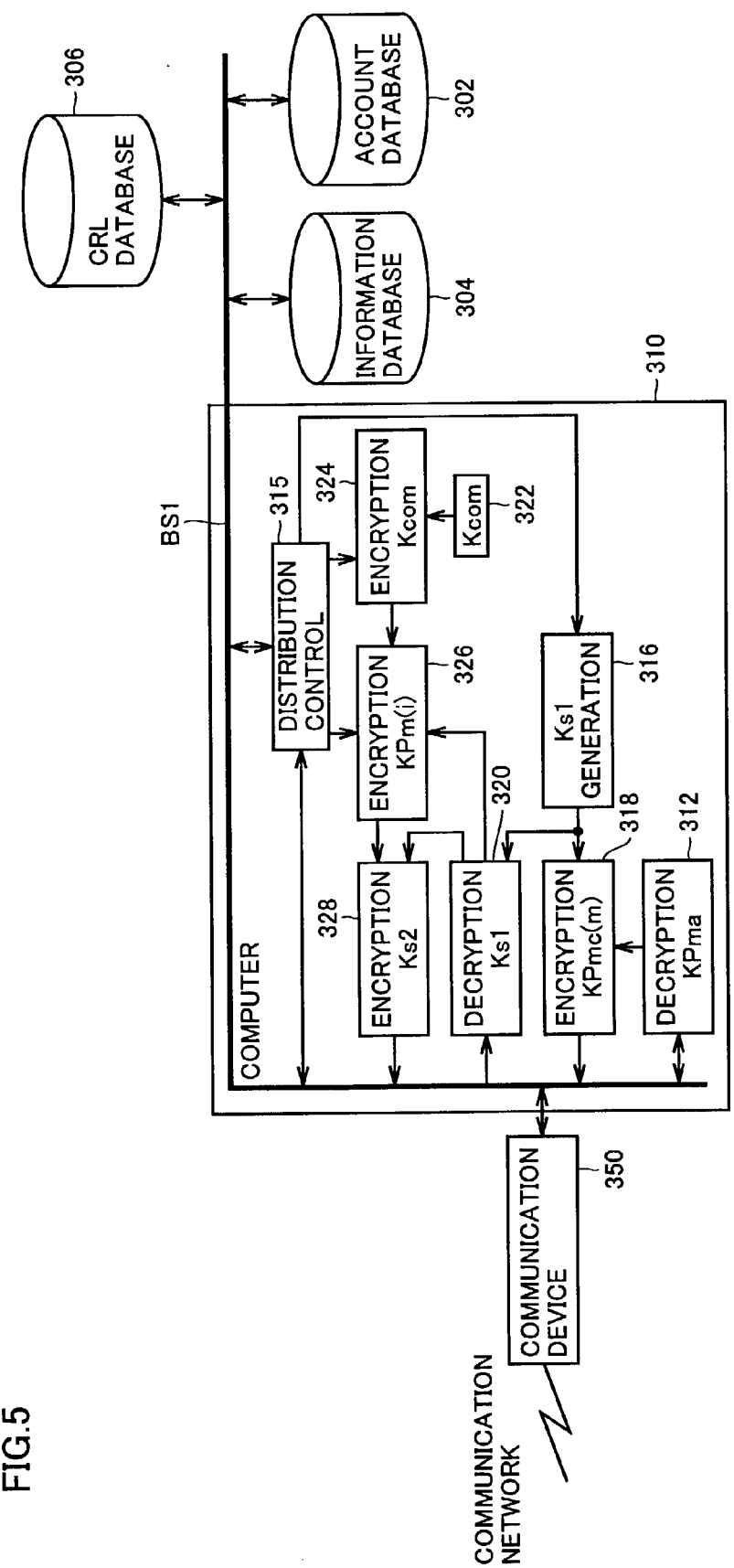
FIG. 5 is a schematic block diagram showing a configuration of a license server shown in FIG. 1.

With reference to FIG. 5, license server 10 includes an information database 304 provided to hold content data encrypted in a predetermined system, information on distribution for example of a license ID and the like, an account database 302 provided to hold account information for each cellular phone user starting an access to content data, a CRL database 306 provided to manage CRL, a data processing unit 310 receiving data from information database 304, account database 302 and CRL database 306 on a data bus BS1 and processing the received data, as predetermined, and a communication device 350 communicating data between distribution carrier 20 and data processing unit 310 on a communication network.

Data processing unit 310 includes a distribution control unit 315 receiving data on data bus BS1 and accordingly controlling an operation of data processing unit 310, a session key generation unit 316 controlled by distribution control unit 315 to generate session key Ks1 in a distribution session, a decryption unit 312 receiving via communication device 350 and on data bus BS1 authentication data {KPmc(m)//Cmc(m)}KPma and {KPp(n)//Cp(n)}KPma transmitted from a memory card and a cellular phone, and decrypting the received data with KPma, an encryption unit 318 encrypting session key Ks1 generated by session key generation unit 316, with public encryption key KPmc(m) obtained by decryption unit 312, for output on data bus BS1, and a decryption unit 320 receiving and decrypting data encrypted with session key Ks1 and then transmitted on data bus BS1.

Data processing unit 310 further includes a Kcom hold unit 322 holding secret key Kcom shared by reproduction circuits, an encryption unit 324 using secret key Kcom to encrypt license key Kc and reproduction circuit control information AC2 received from distribution control unit 315, an encryption unit 326 encrypting data received from encryption unit 324 with public encryption key KPm(i) obtained by decryption unit 320 and unique to a memory card, and an encryption unit 328 further encrypting an output of encryption unit 326 with session key Ks2 received from decryption unit 320, for output on data bus BS1.

Note that if symmetric key Kcom is replaced by a set of public encryption key KPcom in a public-key cryptosystem and private decryption key Kcom, a component corresponding to Kcom hold unit 322 holds public encryption key KPcom and encryption unit 324 uses public encryption key KPcom to effect encryption.

License server 10 in a distribution session operates, as will later be described with reference to a flow chart.

Figure 6:
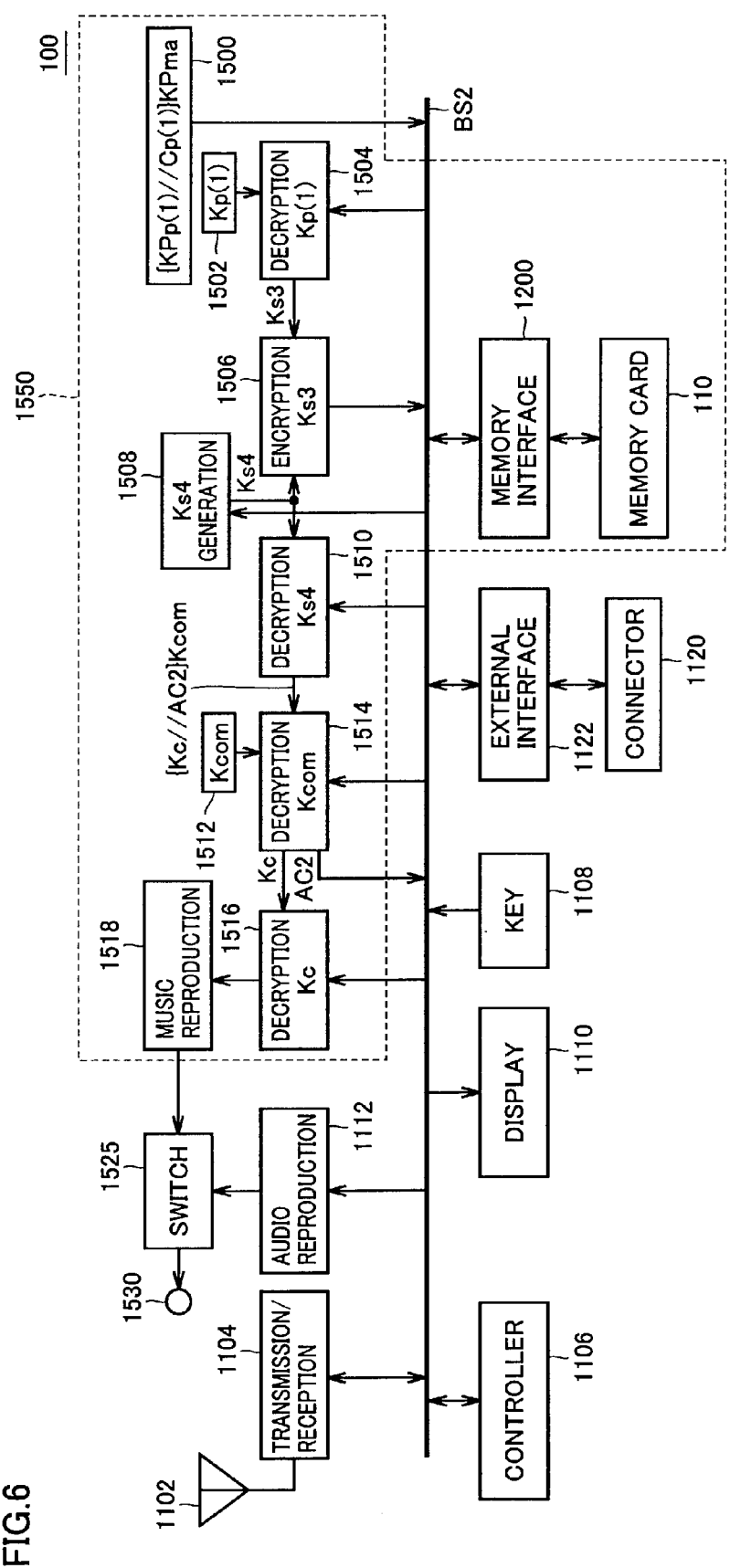
FIG. 6 is a schematic block diagram showing a configuration of a cellular phone shown in FIG. 1.

With reference to FIG. 6, cellular phone 100 has a class represented by natural number n=1 and it is individually identified by natural number i=1.

Cellular phone 100 includes an antenna 1102 receiving a signal transmitted on a cellular phone network by wireless, a transmission and reception unit 1104 receiving a signal from antenna 1102 and converting the received signal to a baseband signal or modulating data received from the cellular phone and providing the modulated data to antenna 1102, a data bus BS2 allowing data communication between components of cellular phone 100, and a controller 1106 controlling an operation of cellular phone 100 via data bus BS2.

Cellular phone 100 further includes a key unit 1108 having keys pressed to input an external instruction to cellular phone 100, a display 1110 presenting information output for example from controller 1106 to a cellular phone user visibly, an audio reproduction unit 1112 operative in a normal conversation operation to reproduce speech based on data received on database BS2, a connector 1120 provided to allow external data communication, an external interface 1122 converting data received from connector 1120 into a signal that can be provided on data bus BS2, or converting data received on data bus BS2 into a signal that can be provided to connector 1120.

Cellular phone 100 further includes a detachably attachable memory card 110 storing and decrypting content data (music data) received from distribution server 30, a memory interface 1200 controlling data communication between provided memory card 110 and data bus BS2, and an authentication data hold unit 1500 holding data encrypted authenticatable when public encryption key KPp(1) and class certificate Cp(1) set for each cellular phone class are decrypted with authentication key KPma.

Cellular phone 100 further includes a Kp hold unit 1502 holding private decryption key Kp(1) unique to the class of the cellular phone (the content reproduction circuit), a decryption unit 1504 using Kp(1) to decrypt data received on data bus BS2, and obtaining session key Ks3 generated by the memory card, a session key generation unit 1508 using a random number or the like to generate session key Ks4 for encrypting data communicated with memory card 110 on data bus BS2 in a reproduction session reproducing content data stored in memory card 110, an encryption unit 1506 using session key Ks3 obtained by decryption unit 1504, to encrypt generated session key Ks4 for output on data bus BS2, and a decryption unit 1510 using session key Ks4 to decrypt data on data bus BS2 for output.

Cellular phone 100 further includes a Kcom hold unit 1512 holding secret key Kcom set to be shared by reproduction circuits, a decryption unit 1514 using secret key Kcom to decrypt {Kc//AC2}Kcom output from decryption unit 1510, and outputting license key Kc and reproduction circuit control information AC2, a decryption unit 1516 receiving encrypted content data {Data}Kc on data bus BS2, decrypting the received data with license key Kc obtained from decryption unit 1514, and outputting content data, a music reproduction unit 1518 receiving an output of decryption unit 1516 and reproducing content data, a switch unit 1525 receiving and selectively outputting an output of music reproduction unit 1518 and that of audio reproduction unit 1112 for different modes of operation, and a connection terminal 1530 receiving and connecting an output of switch unit 1525 to a headphone 130.

Note that for the purpose of simplifying the description, FIG. 6 only shows a cellular phone at a block relating to distribution and reproduction of music data in accordance with the present invention. The cellular phone of course has a block relating to conversation, which is only partially described herein.

Furthermore, the cellular phone can be used more conveniently if in cellular phone 100 the entirety of the block relating to distribution and reproduction of content data, as shown in FIG. 6, surrounded by a dotted line excluding a block relating to a conversation-processing, is provided in the form of a detachably attachable, music reproduction module 1550.

Note that if symmetric key Kcom is replaced by a set of public encryption key KPcom in a public-key cryptosystem and private decryption key Kcom, a component corresponding to Kcom hold unit 1512 holds private decryption key Kcom and decryption unit 1514 uses private decryption key Kcom to provide decryption.

In cellular phone 100 each component operates in each session, as will later be described more specifically with reference to a flow chart.

Figure 7:
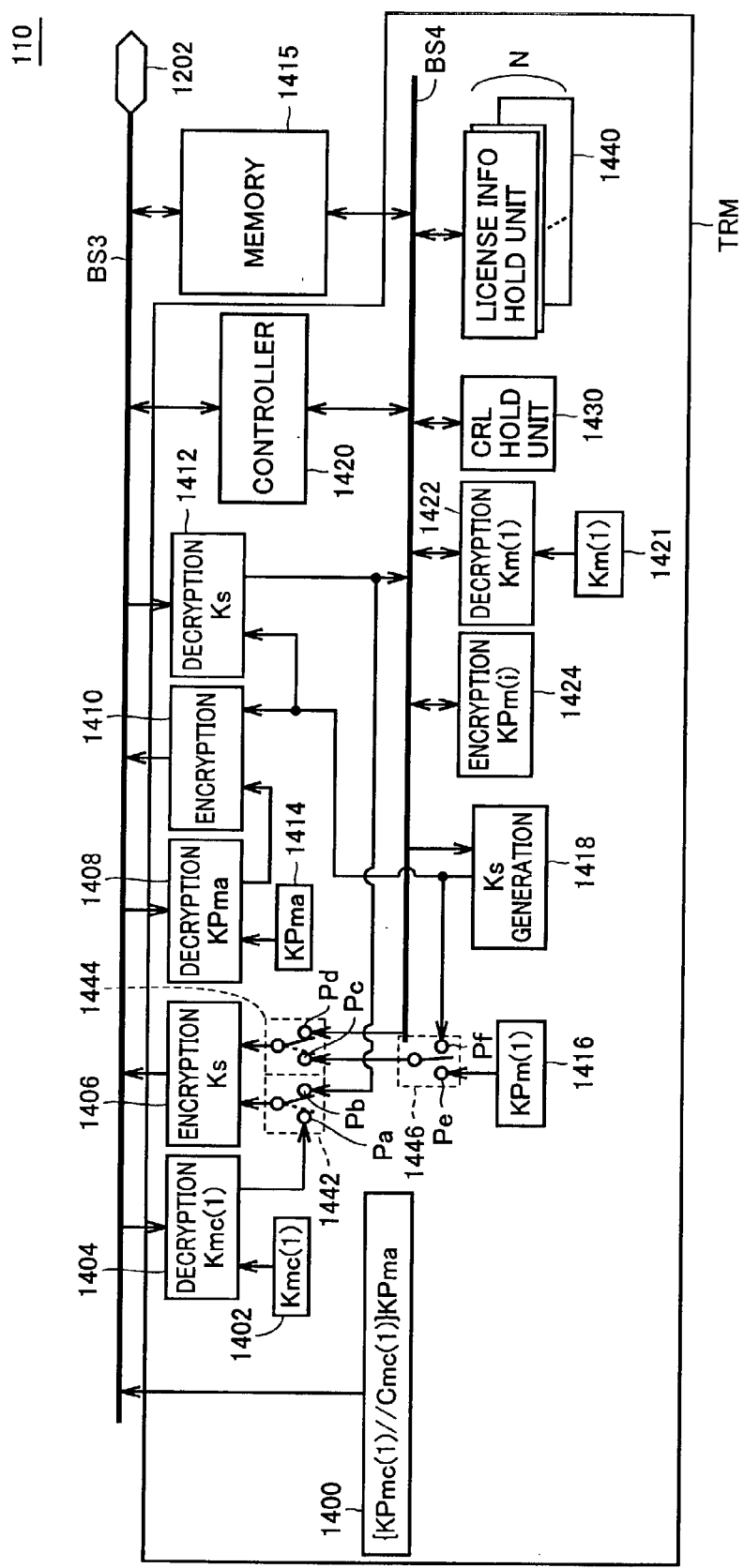
FIG. 7 is a schematic block diagram showing a configuration of a memory card shown in FIG. 6.

With reference to FIG. 7, public encryption key KPm(i) and private decryption key Km(i) corresponding thereto each have a value unique to each memory card and for memory card 110 natural number i=1 for the sake of convenience. Furthermore there are also provided public encryption key and private decryption key KPmc(m) and Kmc(m) unique to each memory card class and a memory card class certificate Cmc(m) and for memory card 110 natural number m=1 for the sake of convenience.

Thus memory card 110 includes an authentication data hold unit 1400 holding authentication data {KPmc(1)//Cmc(1)}KPma, a Kmc hold unit 1402 holding a unique decryption key Kmc(1) set for each memory card class, a Km(1) hold unit 1421 holding private decryption key Km(1) set unique to each memory card, and a KPm(1) hold unit 1416 holding public encryption key KPm(1) decryptable with Km(1).

By thus providing an encryption key of a recording device corresponding to a memory card, distributed content data, an encrypted license key and the like can be managed for each memory card.

Memory card 110 further includes a data bus BS3 communicating a signal with memory interface 1200 via a terminal 1202, a decryption unit 1404 receiving data on data bus BS3 via memory interface 1200 and private decryption key Kmc(1) unique to each memory card type from Kmc(1) hold unit 1402, and outputting to a contact Pa session key Ks1 generated by distribution server 30 in a distribution session or session key Ks3 generated by a different memory card in a transfer session, a decryption unit 1408 receiving authentication key KPma from KPma hold unit 1414 and using KPma to provide a decryption process based on data received on data bus BS3, and outputting to encryption unit 1410 a result of the decryption, and an encryption unit 1406 using a key selectively provided via switch 1442, to encrypt data selectively provided via switch 1444, for output on data bus BS3.

Memory card 110 further includes a session key generation unit 1418 generating session key Ks3 in each of distribution, reproduction and transfer sessions, a encryption unit 1410 encrypting session key Ks3 output from session key generation unit 1418, with public encryption key KPp(n) or KPmc(m) obtained by decryption unit 1408, for output on data bus BS3, and a decryption unit 1412 receiving the data on BS3 encrypted with session key Ks3, decrypting the received data with session key Ks3 obtained from session key generation unit 1418, and outputting a result of the decryption on data bus BS4.

Memory card 110 further includes an encryption unit 1424 encrypting data on data bus BS4 with public encryption key KPm(i) of another memory card, wherein i≠1, a decryption unit 1422 decrypting data on data bus BS4 with private decryption key Km(1) unique to memory card 110 and paired with public encryption key KPm(1), and a memory 1415 receiving and storing therein license key Kc, reproduction circuit control information AC2 and license information (a content ID, a license ID, access control information AC1) encrypted with public encryption key KPm(1) and transmitted on data bus BS4, and receiving and storing therein encrypted content data {Data}Kc and additional information Data-inf transmitted on data bus BS3. Memory 1415 is for example a semiconductor memory.

Memory card 110 further includes a CRL hold unit 1430 provided to store CRL updated, as required, by differential data CRL_dat provided from a distribution server to update a version of the class revocation list, a license information hold unit 1440 holding a license ID, a content ID and access restriction information AC1 obtained by decryption unit 1422, and a controller 1420 communicating data externally on data bus BS3 and receiving reproduction information and the like on data bus BS4 to control an operation of memory card 110.

License information hold unit 1440 is capable of transmitting and receiving license information (a content ID, a license ID, access control information AC1) on data bus BS4. License information hold unit 1440 has N banks, wherein N represents a natural number, and holds for each bank the license information corresponding to each license.

Note that in FIG. 7, the portion surrounded by a solid line is adapted to be incorporated in memory card 110 at a module TRM so that for example when it is externally, improperly opened, internal data is erased or internal circuitry is destroyed to prevent a third party from reading for example data in a circuit existing in the portion surrounding by the solid line. Such a module is typically the tamper resistant module.

Of course memory 1415 may also together be incorporated into module TRM, although in the FIG. 7 configuration, with memory 1415 holding reproduction information required for reproduction, all in the form of encrypted data, a third party simply having the data in memory 1415 cannot reproduce music and furthermore it is not necessary to arrange memory 1415 in the expensive tamper resistance module and the production cost can thus be reduced.

If a sufficient TRM region can be ensured, however, it is not disadvantageous if license hold unit 1440 holds all reproduction information (license key Kc, reproduction circuit control information AC2, a license ID, a content ID and access restriction information AC1) decrypted and thus provided in the form of plaintext, and a similar effect can be obtained.

In the present embodiment the data distribution system operates in each session, as will now be described more specifically with reference to a flow chart.

Initially the FIGS. 8 and 9 flow chart will be referred to to describe a distribution operation, (hereinafter also referred to as a distribution session) provided in purchasing content in the data distribution system of the first embodiment.

Figure 8:
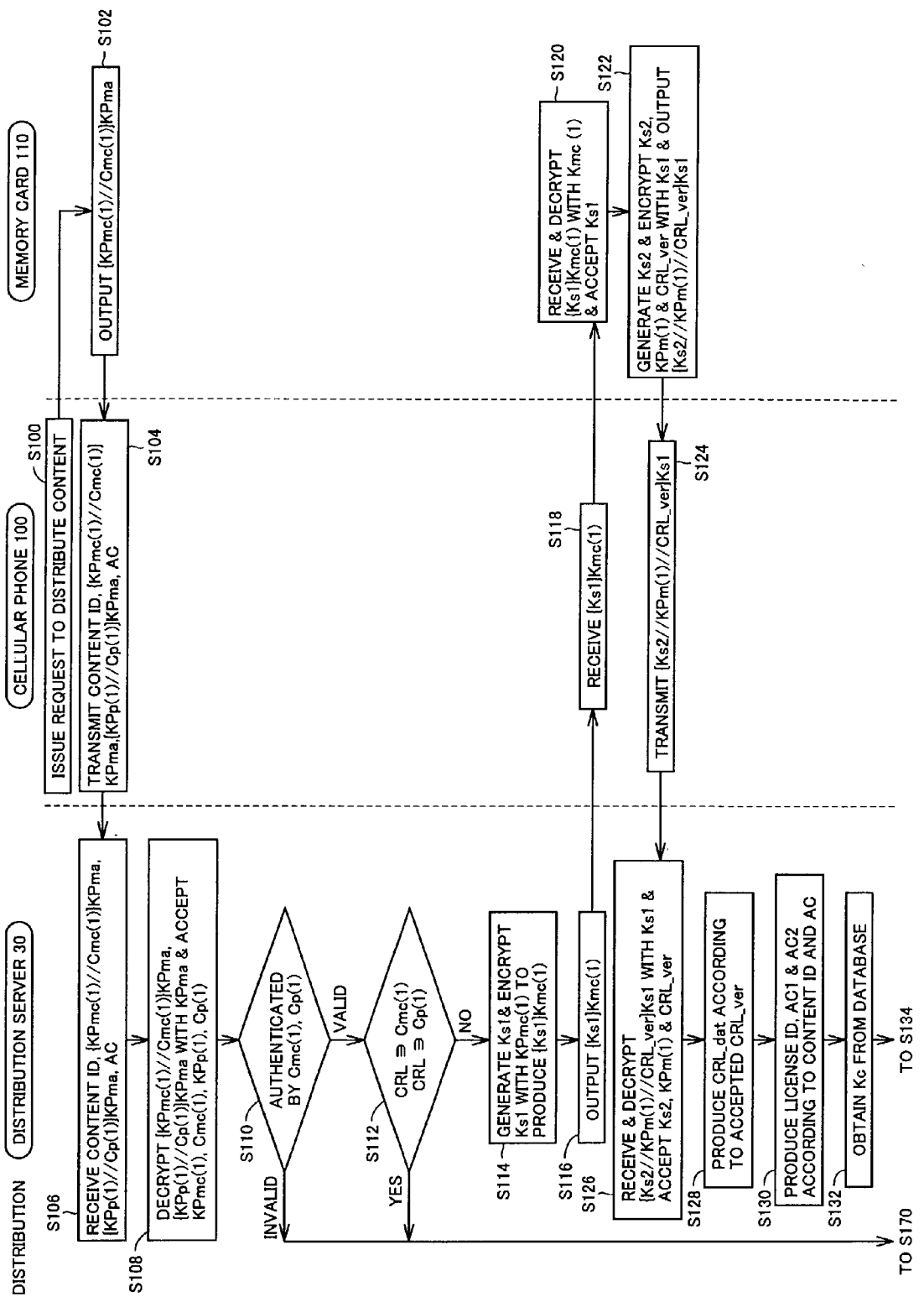
FIGS. 8 and 9 are first and second flow charts, respectively, for illustrating a distribution operation in the data distribution system according to the first embodiment.
Figure 9:
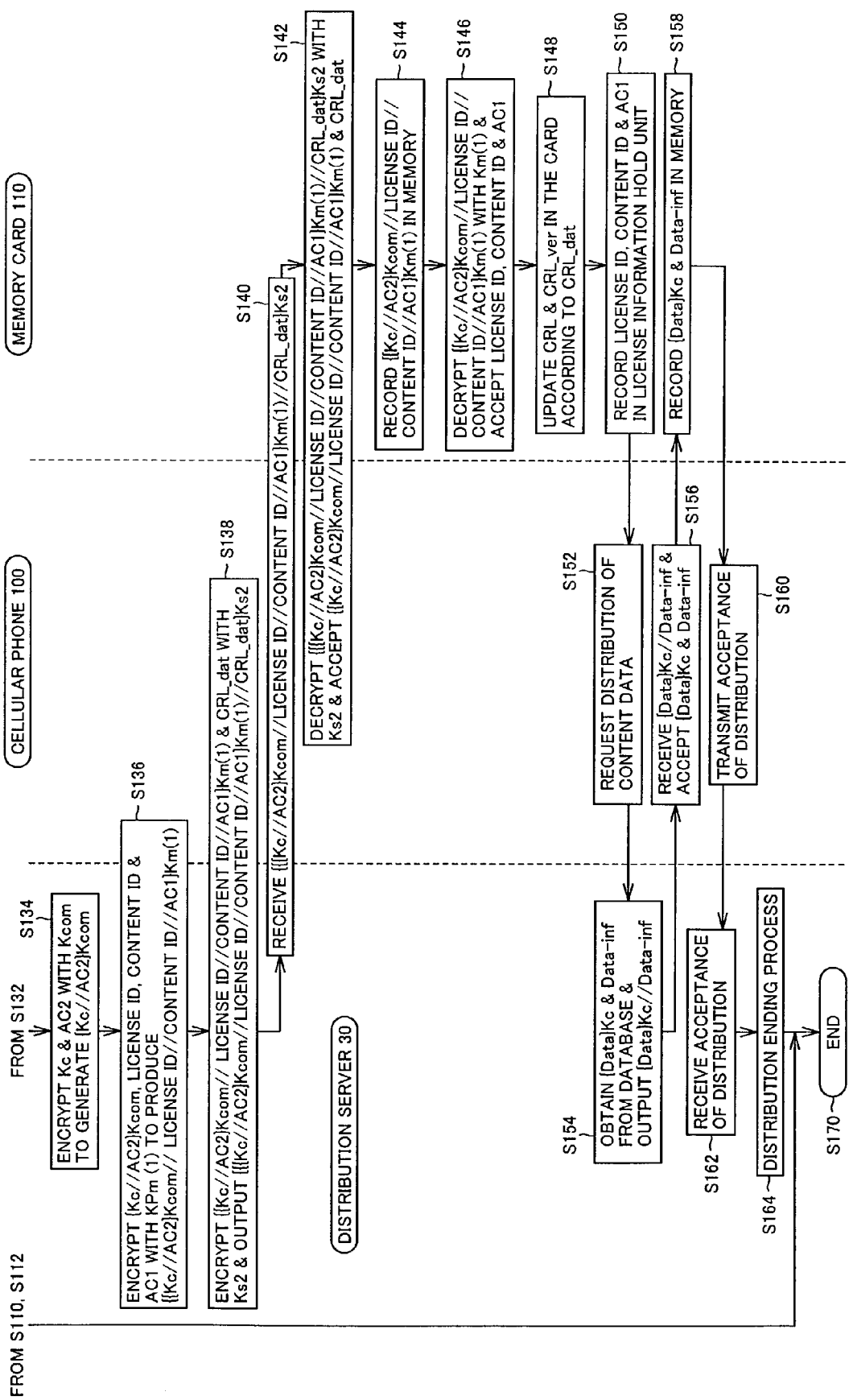

In FIGS. 8 and 9 is described an operation when cellular phone user 1 uses memory card 110 to receive via cellular phone 100 content data corresponding to music data distributed from distribution server 30.

With reference to FIG. 8, cellular phone user 1 of cellular phone 100 for example presses a key button on key unit 1108 to issue an request to distribute data (step S100).

In memory card 110 responds to the distribution request by allowing authentication data hold unit 1400 to output authentication data {KPmc(1)//Cmc(1)}KPma (step S102).

Cellular phone 100 transmits authentication data {KPmc(1)//Cmc(1)}KPma received from memory card 110 for authentication, as well as authentication data {KPp(1)//Cp(1)}KPma for authentication of a content reproduction circuit, a content ID and license purchasing condition data AC to distribution server 30 (step S104).

Distribution server 30 receives the content ID, authentication data {KPmc(1)//Cmc(1)}KPma, authentication data {KPp(1)//Cp(1)}KPma and license purchasing condition AC from cellular phone 100, in decryption unit 312 effects decryption with authentication key KPma, and receives public encryption key and class certification data KPmc(1) and Cmc(1) of memory card 110 and public encryption key and class certification data KPp(1) and Cp(1) of the content reproduction circuit of cellular phone 100 (step S108).

Distribution control unit 315 sends to authentication server 12 a query based on class certification data Cmc(1) and Cp(1) received and if these class certificates are valid the equipment of interest is proper equipment it is confirmed that the public encryption keys are valid, and the control then moves on to a subsequent step (step S112). If the public encryption keys are invalid the process ends (step S170) (step S110).

Since authentication data {KPmc(1)}KPma and {KPp(1)}KPma are encrypted such that their authenticities can be determined when they are decrypted with authentication key KPma, distribution control unit 315 of license server 10 may be adapted to uniquely provide authentication from a result of decryption, rather than sending a query to authentication server 12.

When a query reveals that the equipment of interest is proper equipment, distribution control unit 315 sends to CRL database 306 a query as to whether class certificates Cmc(1) and Cp(1) of memory card 110 and the content reproduction circuit of cellular phone 100 are listed on CRL. If so then the distribution session ends (step S170).

If the class certificates are not found on the list then the control moves on to a subsequent step (step S112).

If a query reveals that a cellular phone having a memory card and a reproduction circuit with proper class certificates is demanding an access and that their classes are not found on the class revocation list then in distribution server 30 session key generation unit 316 produces session key Ks1 for distribution. Session key Ks1 is encrypted by encryption unit 318 using public encryption key KPmc(1) obtained by decryption unit 312 and corresponding to memory card 110 (step S114).

Encrypted session key Ks1 is externally output as {Ks1}Kmc (1) on data bus BS1 and via communication device 350 (step S116).

When cellular phone 100 receives encrypted session key {Ks1}Kmc (1) (step S118), in memory card 110 the received data received via memory interface 1200 and transmitted on data bus BS3 is decrypted by decryption unit 1404 using private decryption key Kmc(1) held in hold unit 142 and unique to memory card 110 and session key Ks1 is thus decrypted and extracted (step S120).

When controller 1420 confirms that session key Ks1 generated by distribution server 30 has accepted, it instructs session key generation unit 1418 to generate session key Ks2, which a memory card generates in a distribution operation.

Furthermore, in the distribution session, control 1420 extracts version data CRL_ver of the class revocation list stored in CRL hold unit 1430 of memory card 100 and outputs the data on data bus BS4. Data CRL_ver is information on a state (a version) of the class revocation list stored in CRL hold unit 1430.

Encryption unit 1406 uses session key Ks1 received from decryption unit 1404 via a contact Pa of switch 1442, to encrypt session key Ks2, public encryption key KPm(1) and class revocation list version data CRL_ver provided via switches 1444 and 1446 having their respective contacts switched successively and provide them in a series of data and output {Ks2//KPm(1)//CRL_ver}Ks1 on data bus BS3 (step S122).

Encrypted data {Ks2//KPm(1)//CRL_ver}Ks1 output on data bus BS3 is output therefrom via terminal 1202 and memory interface 1200 to cellular phone 100 and transmitted from cellular phone 100 to distribution server 30 (step S124).

Distribution server 30 receives encrypted data {Ks2//KPm(1)//CRL_ver}Ks1, in decryption unit 320 decrypts the data with session key Ks1, and accepts session key Ks2 generated in memory card 110, public encryption key Kpm (1) unique to memory card 110, and class revocation list version data CRL_ver in memory card 110 (step S126).

Class revocation list version information CRL_ver is transmitted on data bus BS1 to distribution control unit 315, which generates differential data CRL_dat according to the accepted version data CRL_ver (step S128). Differential data CRL_data represents a variation between the version of the CRL_ver of interest and the current version of the class revocation list data in CRL database 306.

Furthermore, distribution control unit 315 generates a license ID, access restriction information AC1 and reproduction circuit control information AC2 according to content ID and license purchasing condition AC obtained at step S106 (step S130). Furthermore it obtains license key Kc from information database 304 to decrypt encrypted content data (step S132).

With reference to FIG. 9, distribution control unit 315 provides obtained license key Kc and reproduction circuit control information AC2 to encryption unit 324, which in turn encrypts license key Kc and reproduction circuit control information AC2 with secret key Kcom obtained from Kcom hold unit 322 (step S134).

Encrypted data {Kc//AC2}Kcom output from encryption unit 324, and the license ID, content ID and access restriction information AC1 output from distribution control unit 315 are encrypted by encryption unit 326 using public encryption key KPm(1) obtained by decryption unit 320 and unique to memory card 110 (step S136). Encryption unit 328 receives an output of encryption unit 326 and class revocation list version updating information CRL_dat output from distribution control unit 315 and encrypts them with session key Ks2 generated in memory card 110. Encryption unit 328 outputs the encrypted data which is in turn transmitted on data bus BS1 and via communication device 350 to cellular phone 100 (step S138).

Thus, a distribution server and a memory card generate encryption keys, respectively, mutually communicate the encryption keys, use them to effect encryption, and mutually transmit the encrypted data. Thus in transmitting and receiving their respective encrypted data a mutual authentication can in effect also be achieved to enhance the security of the data distribution system.

Cellular phone 100 receives encrypted data {{{KC//AC2}Kcom//license ID//content ID//AC1}Km(1)//CRL_dat}Ks2 transmitted (step S140) and in memory card 110 decryption unit 1412 decrypts data transmitted via memory interface 120 and on data bus BS3. Decryption unit 1412 uses session key Ks2 received from session key generation unit 1418 to decrypt the received data on data bus BS4 for output on data bus BS4 (step S142).

Output at this stage on data bus BS4 are encrypted reproduction information {{KC//AC2}Kcom//license ID//content ID//AC1}Km(1) decryptable with private decryption key Km(1) held in Km(1) hold unit 1421, and CRL_dat. According to an instruction from controller 1420, encrypted reproduction information {{KC//AC2}Kcom//license ID//content ID//AC1}Km (1) is recorded in memory 1415 (step S144). On the other hand, {{KC//AC2}Kcom//license ID//content ID//AC1}Km(1) is decrypted by decryption unit 1422 using private decryption key Km(1), and only license information corresponding a license ID, a content ID and access restriction information AC1 are accepted (step S146).

Controller 1420 refers to the received CRL_dat to update CRL data in CRL hold unit 1430 and the version thereof (step S148). The license ID, the content ID and access restriction information AC1 are recorded in license information hold unit 1440 (step S150).

When the process up to step S150 normally completes in a memory circuit, cellular phone 100 sends a request to distribution server 30 to distribute content data (step S152).

Distribution server 30 receives the content data distribution request, obtains encrypted content data {Data}Kc and additional information Data-inf from information database 340 and outputs these data on data bus BS1 and via communication device 350 (step S154).

Cellular phone 100 receives {Data}Kc//Data-inf and accepts encrypted content data {Data}Kc and additional information Data-inf (step S156). Encrypted content data {Data}Kc and additional information Data-inf are transmitted via memory interface 1200 and terminal 1202 to data bus BS3 of memory card 110. Memory card 110 records the received encrypted content data {Data}Kc and additional information Data-inf in memory 1415 as they are (step S158).

Furthermore, memory card 110 transmits to distribution server 30 a notification that the distribution has been accepted (step S160) and when distribution server 30 receives the notification (step S162) a process to complete the distribution is carried out including e.g., storing account data to account database 302 (step S164) and the entire process ends (step S170).

Thus the content reproduction unit of cellular phone 100 and memory card 110 are confirmed as proper equipment and public encryption keys Kp(1) and Kmc(1) successfully encrypted and transmitted together with class certificates Cp(1) and Cmc(1), respectively, are also confirmed valid, and only then can content data be distributed in response only to a distribution request from equipment without class certificates Cp(1) or Cmc(1) found in the class revocation list, i.e., a class certificate list with encryption by means of public encryption keys KPp(1) and KPmc(1) broken. Thus, distributing data to improper equipment and equipment with encryption broken can be prevented.

Figure 10:
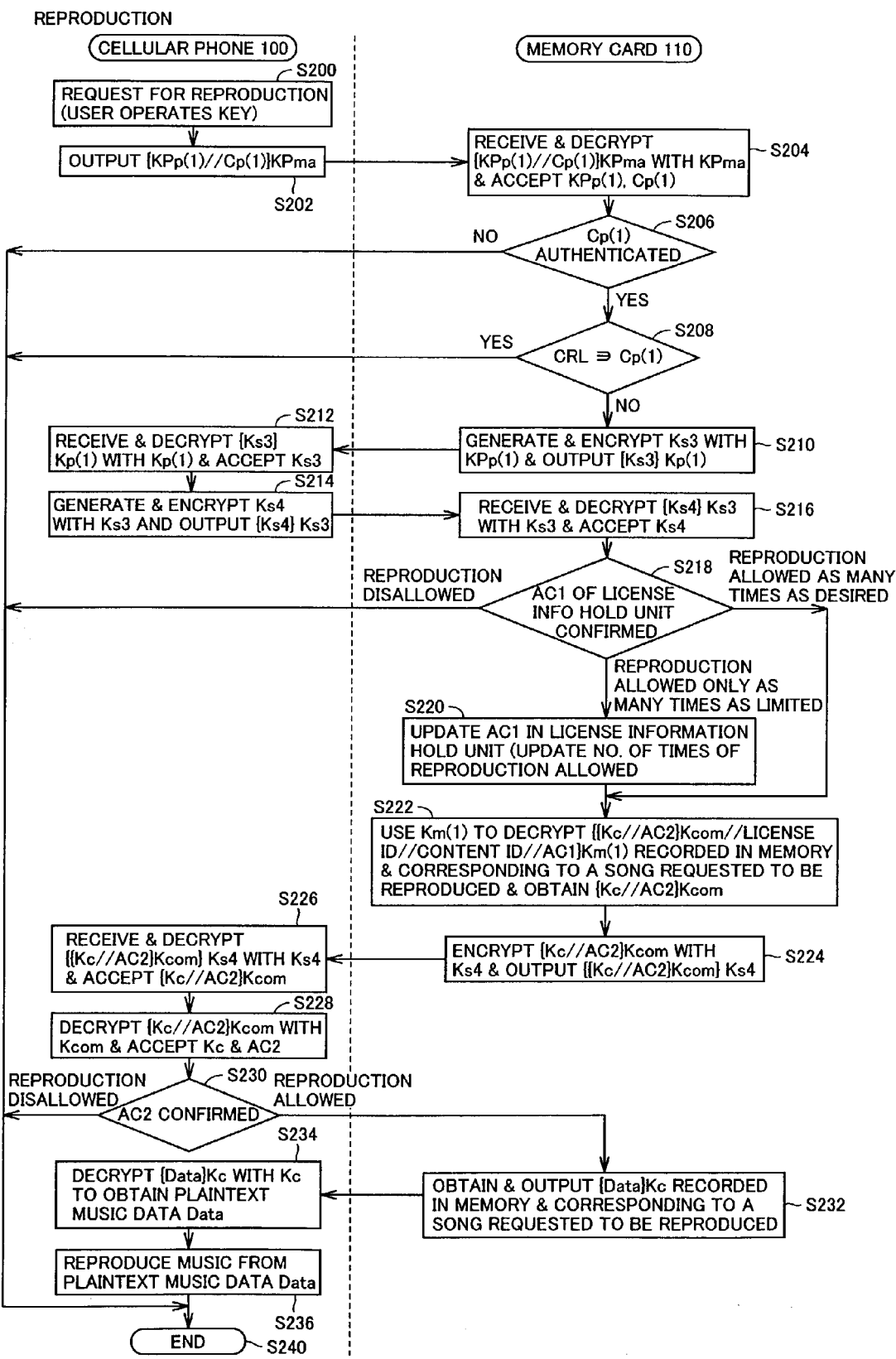
FIG. 10 is a flow chart for illustrating a reproduction operation in a cellular phone of the first embodiment to decrypt encrypted content data to externally output it as music.

Reference will now be made to FIG. 10 to describe a reproduction operation (hereinafter also referred to as a reproduction session) provided in cellular phone 100 to reproduce music from encrypted content data held in memory card 110 and externally output the music.

With reference to FIG. 10, cellular phone user 1 inputs an instruction to a cellular phone via a key unit 1108 having keys pressed to generate a request for reproduction (step S200). In response to the reproduction request being generated, in cellular phone 100 authentication data hold unit 1500 outputs on data bus BS2 authentication data {KPp(1)//Cp(1)}KPma, which is authenticatable when it is decrypted with authentication key KPma (step S202).

Authentication data {KPp(1)//Cp(1)}KPma is transmitted on data bus BS2 and via memory interface 1200 to memory card 100.

In memory card 110, authentication data {KPp(1)//Cp(1)}KPma, transmitted via terminal 1202 and on data bus BS3, is taken in by decryption unit 1408, which receives authentication key KPma from KPma hold unit 1414 and decrypts the data on data bus BS3 to obtain public encryption key KPp(1) and class certificate Cp(1)unique to the content reproduction unit or the type of cellular phone 100. Controller 1420 accepts public encryption key KPp(1) and class certificate Cp(1) on data bus BS3 (step S204).

Controller 1420 receives a result of decrypting data in decryption unit 1408 and uses it to effect an authentication process for the content reproduction circuit of cellular phone 100 accepted and if the content reproduction circuit of cellular phone 100 is an approved circuit then the control moves on to a subsequent step S208 (step S206). If not then the reproduction session process ends (step S240).

If cellular phone 100 is confirmed as approved equipment then the control subsequently determines whether the content reproduction unit of cellular phone 100 has class certificate Cp(1) listed on CRL (step S208) and if so then the reproduction session process ends (step S204).

If cellular phone 100 does not have a class listed on CRL then the control moves on to a subsequent step and controller 1420 issues an instruction to session key generation unit 1418 on data bus BS4 to generate session key Ks3 in the reproduction session. Session key Ks3 thus generated is transmitted to encryption unit 1410. Encryption unit 1410 encrypts session key Ks3 with public encryption key KPp(1) of cellular phone 100 obtained by decryption unit 1408, and outputs on data bus BS3 encrypted data {Ks3}Kp(1) decryptable with private decryption key Kp(1) corresponding to public encryption key KPp(1) (step S210).

Cellular phone 100 receives encrypted data {Ks3}Kp(1) on data bus BS via terminal 1202 and memory interface 1200. Encrypted data {Ks3}Kp(1) is decrypted by decryption unit 1504 and session key Ks3 generated in memory card 110 is accepted (step S212).

In response to the acceptance of session key Ks3, controller 1106 issues an instruction to session key generation unit 1508 on data bus BS2 to generate session key Ks4, which is produced by cellular phone 100 in a reproduction session. Session key Ks4 thus produced is transmitted to encryption unit 1506 and session key Ks3 obtained by decryption unit 1504 is used to provide encryption {Ks4}Ks3 which is in turn transmitted on data bus BS2 (step S214).

Encrypted session key {Ks4}Ks3 is transmitted via memory interface 1200 to memory card 110, in which encrypted session key {Ks4}Ks3 is transmitted on data bus BS3 and decrypted by decryption unit 1412 and session key Ks4 generated by the cellular phone is accepted (step S216). In response to the acceptance of session key Ks4, controller 1420 confirms the corresponding access restriction information AC1 existing in license information hold unit 1440 (step S218).

At step S218 is confirmed access restriction information AC1, the information on a restriction imposed on memory access. If it indicates that reproduction is disallowed then the control terminates the reproduction session (step S240). If it indicates that reproduction is allowed only as many times as limited then the control updates data of access restriction information AC1 to update the frequency of reproduction allowed and then moves on to a subsequent step (step S220). If access restriction information AC1 does not limit a reproduction frequency then the control skips step S220 and without updating reproduction control information AC1 moves on to a subsequent step (step S222).

If license information hold unit 1440 does not hold the content ID of a song requested, the control also determines that reproduction is disallowed and the control terminates the reproduction session (step S240).

If at step S218 the control determines that reproduction is possible in the reproduction session of interest, then a decryption process is effected to decrypt reproduction information including license key Kc recorded in memory and associated with a song requested to be reproduced. More specifically, in response to an instruction from controller 1420, encrypted reproduction information {{Kc//AC2}Kcom//license ID//content ID//AC1}Km (1) read from memory 1415 onto data bus BS4 is decrypted by decryption unit 1422 using private decryption key Km(1) unique to memory card 110 and encrypted data {Kc//AC2}Kcom decryptable with common secret key Kcom is obtained on data bus BS4 (step S222).

Obtained encrypted data {Kc//AC2}Kcom is transmitted via a contact Pd of switch 1444 to encryption unit 1406, which in turn further encrypts encrypted data received on data bus BS4, with session key Ks4 received from decryption unit 1412 via contact Pb of switch 1442, and outputs {{Kc//AC2}Kcom}Ks4 on data bus BS3 (step S244).

The encrypted data output on data bus BS3 is transmitted via memory interface 1200 to cellular phone 100.

Encrypted data {{Kc//AC2}Kcom}Ks4 received by cellular phone 100 via memory interface 1200 is transmitted on data bus BS2 and decrypted by decryption unit 1510 and encrypted license key Kc and reproduction circuit control information AC2 are accepted (step S226). Decryption unit 1514 decrypts encrypted data {Kc//AC2}Kcom with secret key Kcom received from Kcom hold circuit 1512 and shared by reproduction circuits to accept license key Kc and reproduction circuit control information AC2 (step S228). Decryption unit 1514 transmits license key Kc to decryption unit 1516 and outputs reproduction circuit control information AC2 on data bus BS2.

Controller 1106 accepts reproduction circuit control information AC2 on data bus BS2 and confirms whether reproduction is allowed (step S230).

If at step S230 the control determines from reproduction circuit control information AC2 that reproduction is disallowed, the reproduction session ends (step S240). If reproduction is allowed, memory card 110 outputs on data bus BS3 encrypted content data {Data}Kc recorded in memory and corresponding to a requested song, and the data is transmitted via memory interface 1200 to cellular phone 100 (step S232).

Encrypted content data {Data}Kc output from memory card 210 and received by cellular phone 100 is transmitted on data bus BS2 and decrypted by decryption unit 1516 using license key Kc to obtain plaintext content data Data (step S234). The decrypted, plaintext content data Data is converted by music reproduction unit 1518 into a music signal (step S230) and the reproduced music is output externally via a mixing unit 1525 and a terminal 1530. Thus the process ends (step S240).

Thus on the side of memory card 110 the class of cellular phone 100 corresponding to a content reproduction circuit can be determined and if it is listed on a class revocation list then a reproduction process can be prohibited for the class.

In a reproduction session, cellular phone 100 and memory card 110 also generate encryption keys, respectively, mutually communicate the encryption keys, effect encryption with their respectively received encryption keys, and mutually transmit the encrypted data. Thus, in the reproduction session, as well as a distribution session, in their respectively transmitting and receiving data a mutual authentication can also in effect be achieved to enhance the security of the data distribution system.

Figure 11:
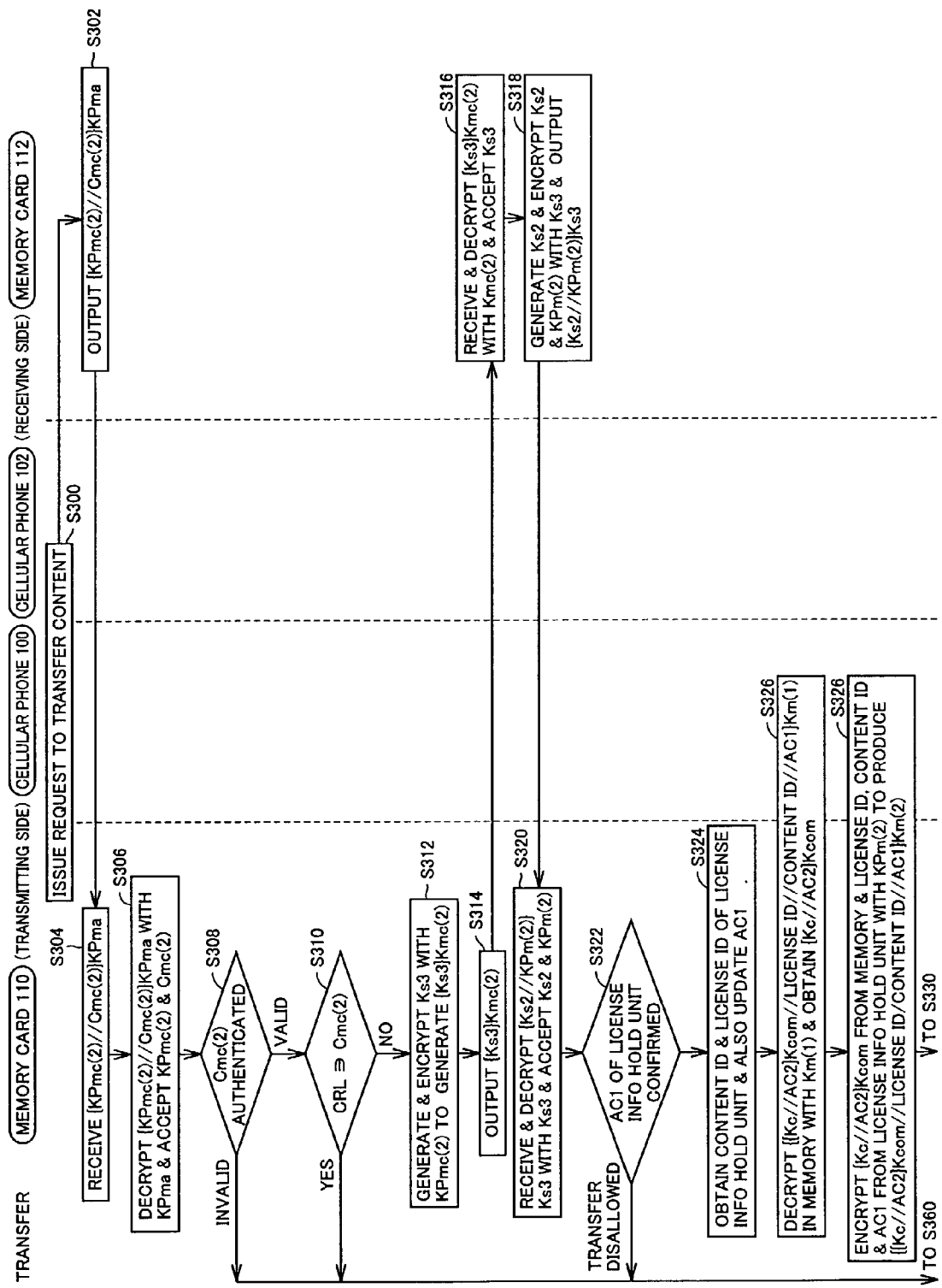
FIGS. 11 and 12 are first and second flow charts, respectively, for illustrating a process provided to transfer content data, key data and the like between two memory cards of the first embodiment.
Figure 12:
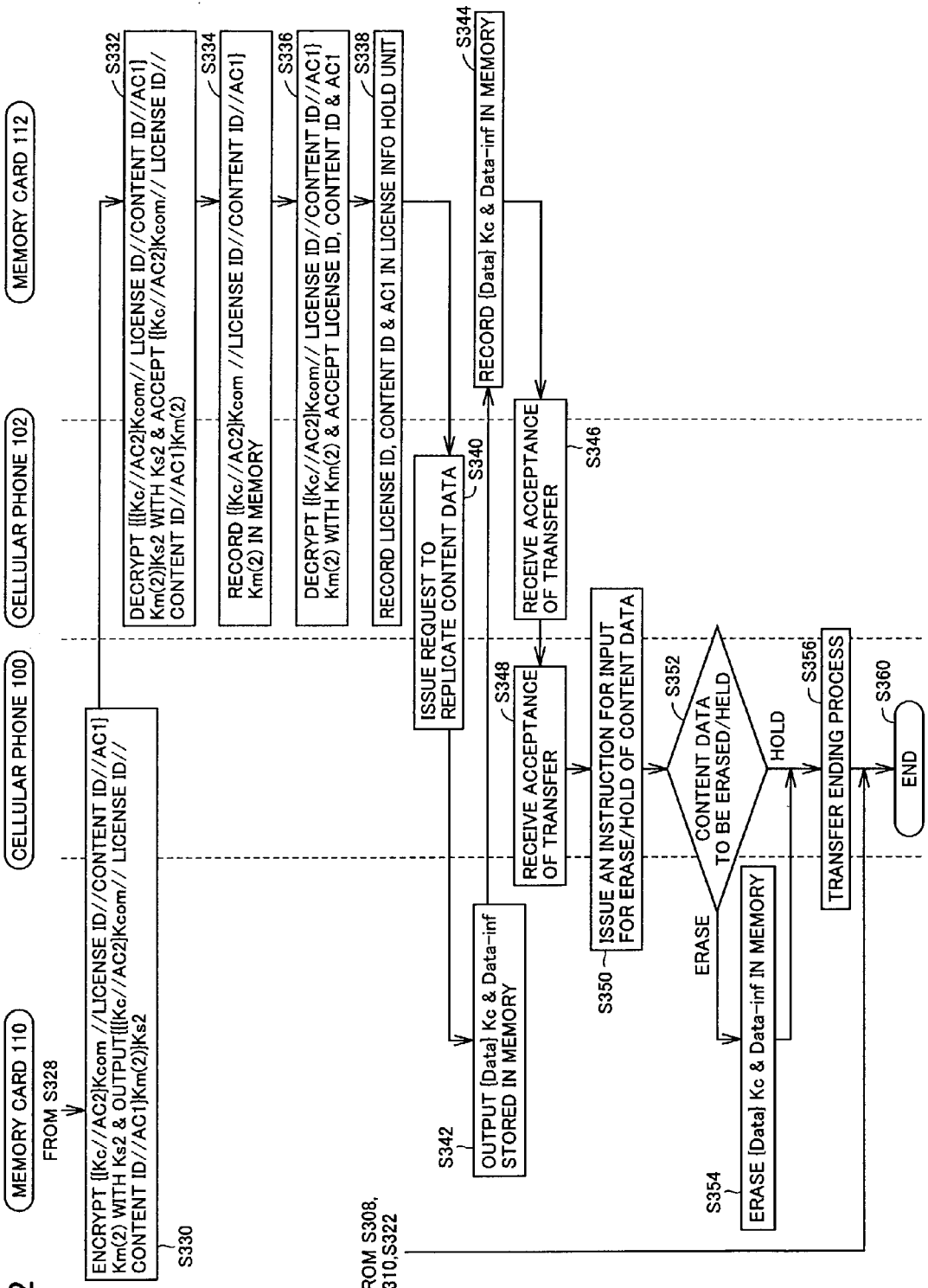

Reference will now be made to FIGS. 11 and 12 to describe a process provided to transfer content data, key data and the like between two memory cards 110 and 112 via cellular phones 100 and 102.

In FIGS. 11 and 12, cellular phone 100 and memory card 110 have their respective classes identified by natural number m=1 and natural number n=1, respectively, and cellular phone 102 and memory card 112 have their respective classes identified by natural number m=2 and natural number n=2, respectively, and memory cards 110 and 112 are identified by natural number i=1 and natural number i=2, respectively, for the sake of illustration.

In FIGS. 11 and 12, cellular phone 100 and memory card 110 are a transmitting side and cellular phone 102 and memory card 112 are a receiving side for the sake of illustration. Furthermore, cellular phone 102 has attached thereto memory card 112 similar in configuration to memory card 110 for the sake of convenience. Each component of memory card 112 will be described, denoted by a reference character identical to that of the corresponding component of memory card 110.

With reference to FIG. 11, cellular phone user 1 on the transmitting side initially for example presses a key of key unit 1108 to issue from cellular phone 100 a request to transfer content. (step S300).

The transfer request is received by cellular phone 102 of cellular phone user 2 corresponding to the receiving side and it is transmitted to memory card 112. In memory card 112, authentication data hold unit 1500 outputs authentication data {KPmc(2)//Cmc(2)}KPma corresponding to an encryption of public encryption key KPmc(2) and class certificate Cmc(2) corresponding to memory card 112 (step S302).

Authentication data {KPmc(2)//Cmc(2)}KPma of memory card 112 is transmitted from cellular phone 102 of cellular phone user 2 and received by cellular phone 100 of cellular phone user 1 and thus memory card 110 (step S304).

In memory card 110, decryption unit 1408 decrypts the authentication data of memory card 112 to accept the public encryption key KPmc(2) and class certificate Cmc(2) associated with memory card 112 (step S306). Controller 1420 performs an authentication operation based on a result of decryption obtained by authentication unit 1408 and transmitted on data bus BS3 (step S308). Initially, controller 1420 confirms, from a result of decrypting with authentication key KPma authentication data {KPmc(2)//Cmc(2)}KPma related to memory card 112, whether {KPmc(2)//Cmc(2)}KPma is authentication data output from proper equipment, and if it is valid authentication data output from proper equipment then public encryption key KPmc(2) and class certificate Cmc(2) are approved and a subsequent step S310 is carried out. If it cannot be confirmed that the authentication data is output from proper equipment and it is thus determined invalid then the transfer session ends (step S360).

If an authentication reveals that authentication data is valid then controller 1420 subsequently determines whether memory card 112 has class certificate Cmc (2) listed on a class revocation list (step S310). If so then at this stage the transfer session ends (step S360). If not then the control moves on to a subsequent step S312 to effect a transfer session.

At step S312 controller 1420 instructs session key generation unit 1418 to output session key Ks3 generated on the transmitting side in a transfer session. Session key Ks3 thus generated is transmitted to encryption unit 1410, which further encrypts session key Ks3 with public encryption key KPmc(2) of memory card 112 decrypted at step S306 by decryption unit 1408. Thus, encrypted session key {Ks3}Kmc(2) is output on data bus BS3 (step S314) and transmitted via memory interface 1200, cellular phones 100 and 102 to memory card 112.

Memory card 112 receives {Ks3}Kmc(2) output from memory card 110, at decryption unit 1404 decrypts it with private decryption key Kmc(2) corresponding to memory card 112, and accepts session key Ks3 generated by memory card 110 corresponding to the transmitting side (step S316).

In memory card 112 controller 1420 in response to the acceptance of session key Ks3 instructs session key generation unit 1418 to generate session key Ks2 to be generated on the receiving side in a transfer session. Session key Ks2 thus generated is transmitted to encryption unit 1406 via contact Pf of switch 1446 and contact Pc of switch 1444.

Encryption unit 1406 receives from decryption unit 1404 session key Ks3 obtained at step S316, uses session key Ks3 to encrypt session key Ks2 and public encryption key KPm(2) obtained by switching contact Pc of switch 144 and a contact of switch 1446, and outputs {Ks2//KPm(2)}Ks3 on data bus BS3 (step S318) and transmitted via cellular phones 102 and 100 and received by memory card 110 and transmitted on data bus BS3.

In memory card 100 the encrypted data transmitted on data bus BS3 is decrypted by decryption unit 1412 using session key Ks3 to accept session key Ks2 and public encryption key KPm(2) associated with memory card 112 (step S320).

In memory card 110 controller 1420 in response to the acceptance of session key Ks2 and public encryption key KPm(2) confirms access restriction information AC1 held in license information hold unit 1440. As a result of confirming access control information AC1 if transferring a license is not allowed then at this stage the transfer ends (step S360). As a result of confirming access restriction information AC1 if a transfer session is found permitted then the control moves on to a subsequent step S322, and it obtains a corresponding content ID and license ID from license information hold unit 1440, and furthermore updates access control information AC1 in license information hold unit 1440 and records that any subsequent reproduction and transfer are revoked (step S324). Responsively, in reproduction and transfer sessions the access control information AC1 of interest is confirmed and a process is carried out, and any subsequent, respective sessions are revoked.

Furthermore controller 1420 instructs memory 1415 to output encrypted reproduction information {{Kc//AC2}Kcom//license ID//content ID//AC1}Km(1) related to session key Kc and reproduction information corresponding to the content data to be transferred. Memory 1415 outputs encrypted reproduction information {{Kc//AC2}Kcom//license ID//content ID//AC1}Km(1), which is in turn decrypted by decryption unit 1422 and {Kc//AC2}Kcom is obtained on data bus BS4 (step S326).

The license ID, content ID and access restriction information AC1 obtained at step S324 from license information hold unit 1440, and {Kc//AC2}Kcom obtained at step S326, are taken in to encryption unit 1424 and encrypted therein. Encryption unit 1424 encrypts these data with public encryption key KPm(2) unique to the receiving memory card 112 obtained at step S320 by decryption unit 1412, and outputs encrypted reproduction information {{Kc//AC2}Kcom//license ID//content ID//AC1}Km(2) (step S328).

With reference to FIG. 12, encrypted reproduction information {{Kc//AC2}Kcom//license ID//content ID//AC1}Km (2) is output on data bus BS4 and transmitted via contact Pd of switch 1444 to encryption unit 1406, which receives via contact Pb of switch 1442 session key Ks2 generated by memory card 112 and obtained by decryption unit 1412, and uses session key Ks2 to encrypt data received via contact Pd.

Encryption unit 1406 outputs encrypted data {{{Kc//AC2}Kcom//license ID//content ID//AC1}Km(2)}Ks2 on data bus BS3 (step S330). The encrypted reproduction information on data bus BS3 is then transmitted via cellular phones 100 and 102 to memory card 112 corresponding to the receiving side in the transfer session.

In memory card 112, decryption unit 1412 effects decryption using session key Ks2 generated by session key generation unit 1418, and encrypted reproduction information {{{Kc//AC2}Kcom//license ID//content ID//AC1}Km (2) is accepted (step S332).

Encrypted reproduction information {{Kc//AC2}Kcom//license ID//content ID//AC1}Km(2) is recorded in memory 1415 (step S334). Furthermore decryption unit 1422 uses private decryption key Km(2) unique to memory card 112 to effect decryption to accept a license ID, a content ID and access restriction information AC1 (step S336).

The license ID, content ID and access restriction information AC1 obtained in decryption unit 1422 are transmitted on data bus BS4 and recorded in license information hold unit 1440 (step S338).

By thus normally completing the process up to step S338, reproduction information including license key Kc is transferred, and in response thereto a request to replicate content data is sent via cellular phone 102 (step S340).

The request to replicate content data is transmitted via cellular phone 100 to memory card 110 and responsively in memory card 110 memory 1415 outputs the corresponding encrypted content data {Data}Kc and additional information Data-inf on data bus BS3 (step S342).

These data on data bus BS3 are transmitted via cellular phones 100 and 102 to memory card 112 and stored in the memory card at memory 1415 (step S344).

When encrypted content data {Data}Kc and additional information Data-inf are completely recorded, an acceptance of the transfer is transmitted via cellular phone 102 (step S346).

Thus, if in memory card 112 and the corresponding cellular phone 102 a reproduction session is normally carried out, cellular phone 102 can reproduced encrypted content data recorded in memory card 112 and the user can listen to the music.

The transmitting cellular phone 100 receives the acceptance of a transfer transmitted from cellular phone 102 (step S348) and the user inputs via key 1108 whether the content data is erased or held (step S350). In the data distribution system of the present embodiment, whether or not reproduction is allowed according to the user's number of licenses and frequency of reproduction allowed, is determined according to access restriction information AC1 by the reproduction session. As such, if on the cellular phone 100 side reproduction is no longer be allowed, it is no longer necessary to hold encrypted content data and the like.

Accordingly, an instruction to erase content data can be input via key unit 1108 to erase the corresponding encrypted content data {Data}Kc and additional information Data-inf in memory card 110 at memory 1415 (step S354). Note that the corresponding license information recorded in license information hold unit 1440 has the same state as erasure, since at step S324 access control information AC1 has been updated and reproduction and transfer sessions have been revoked. Note that overwriting is permitted when distribution or transfer of reproduction information for new content data is received for reproduction information in the same state as erasure.

If an instruction is issued to hold encrypted content data or the like then step S354 is skipped and the transfer process ends at this stage (step S356).

If encrypted content data is recorded in memory 1415, gaining a new access to server 30 and simply receiving a distribution of reproduction information allows encrypted content data to be again reproduced to allow the user to enjoy the music. The distribution process simply with reproduction information, although not shown in the FIGS. 8 and 9 flow chart, is a process excluding steps S152, S154, S156 and S158 relating to the communication of content data and the remainder is similar to the distribution operation as has been described previously and thus will not be described.

If a transfer session is normally provided and a transfer process thus ends (step S356) or for example authentication and checking a class revocation list results in suspension of the transfer session then a skip is made from steps S308, S310 and S322 and the entire transfer session process ends (S360).

Thus also in a transfer session whether or not a cellular phone on a receiving side has a proper memory card attached thereto and whether a class certificate is listed on a class revocation list are determined before a license key, content data and the like are transferred. Thus, transferring content data to any reproduction circuit (or cellular phone) or memory card with a key unique to its class broken, can be prohibited.

Note that in the first embodiment a class revocation list can be used to revoke data distribution, reproduction and transfer for each cellular phone class and each memory card class. Alternatively, the class revocation list may be replaced by a class permission list (CPL) to validate these sessions for any memory cards and cellular phones having classes listed on the class permission list.

In the above configuration, license server 10 holds class permission list CPL at a component corresponding to CRL database 306 and memory card 110 stores class permission list CPL at a component corresponding to CRL hold unit 1430.

Furthermore, if class permission list CPL is used then in a distribution session at step S112 (FIG. 8), a reproduction session at step S208 (FIG. 10) and a transfer session at step S310 (FIG. 11) the inclusion/exclusion decision is simply inverted. Furthermore, also in operating the class permission list, CPL data in a memory card is updated, simply by rewriting a CPL list in the memory card by referring to information updating the differential data and version of the class permission list corresponding to version data CRL_ver and differential data CRL_dat in operating the class revocation list that are output from distribution server 30 when content data is distributed or in response to a request from a user.

In this case, any class corresponding to a reproduction circuit or memory card with a key unique to its class broken is simply required to be deleted from the class permission list accordingly. Thus, executing distribution, transfer and reproduction sessions can be revoked for each reproduction circuit class and each memory card class.

Furthermore, while at step S324 if reproduction information in license information hold unit 1440 is obtained in order to transfer data then access control information AC1 is updated and revoking any subsequent reproduction and transfer is recorded, erasing the data of interest from license information hold unit 1440 is also similarly effective.

Second Embodiment

A second embodiment provides a data distribution system different in configuration from that of the first embodiment in that the former does not provide encryption decryptable with secret key Kcom shared by reproduction circuits.

More specifically the data distribution system of the present embodiment includes a license server 11 in place of license server 10 of distribution server 30 of the data distribution system of the first embodiment. Furthermore in the present embodiment the data distribution system includes a cellular phone having a configuration of cellular phone 101, rather than that of cellular phone 100 as described with reference to FIG. 6.

Figure 13:
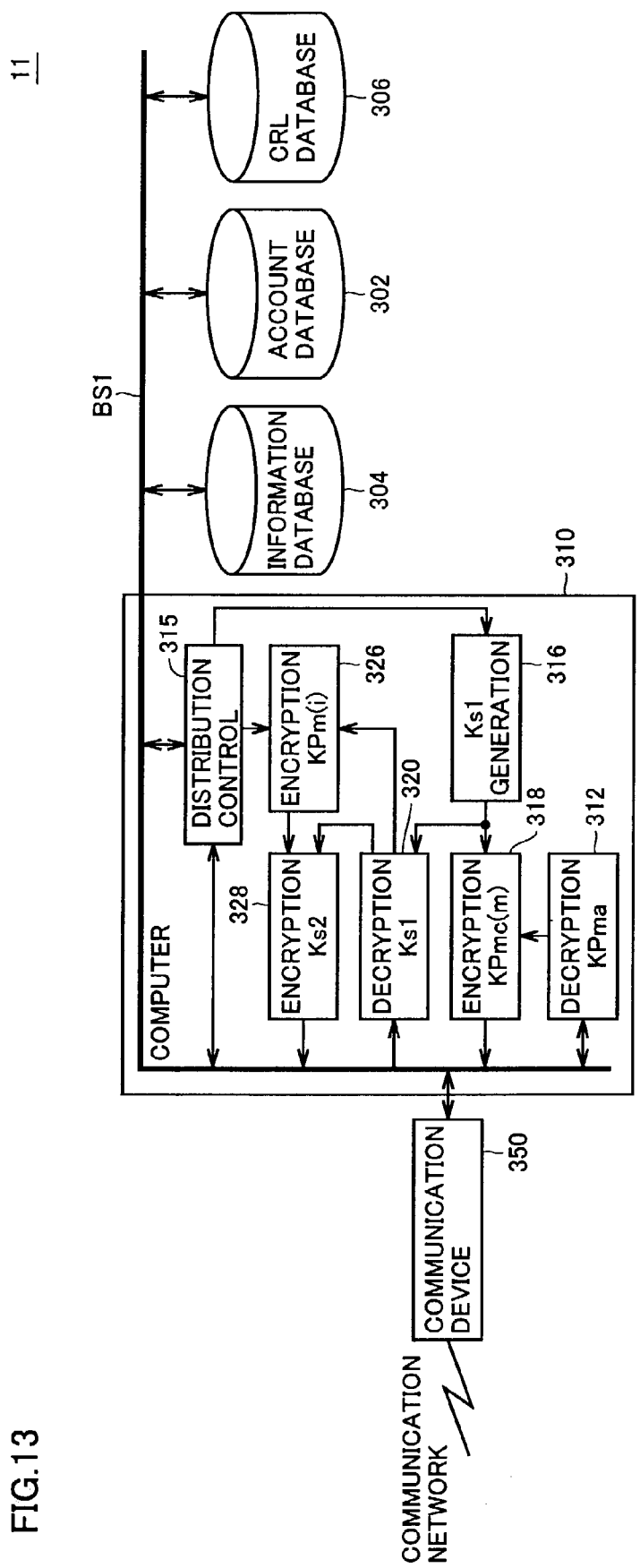
FIG. 13 is a schematic block diagram showing a configuration of a license server of a data distribution system according to a second embodiment.

With reference to FIG. 13, license server 11 is different from license server 10 in that the former excludes unit 322 holding secret key Kcom shared by reproduction circuits, and encryption unit 324 using secret key Kcom. More specifically, in license server 11 license key Kc and reproduction circuit control information AC2 output from distribution control unit 315 are transmitted directly to encryption unit 326. The remaining circuit configurations and operations are similar to those of the FIG. 4 license server 10 and thus will not be described.

Hereinafter license server 11, authentication server 12 and distribution carrier 20 will generally be referred to as a distribution server 31.

Figure 14:
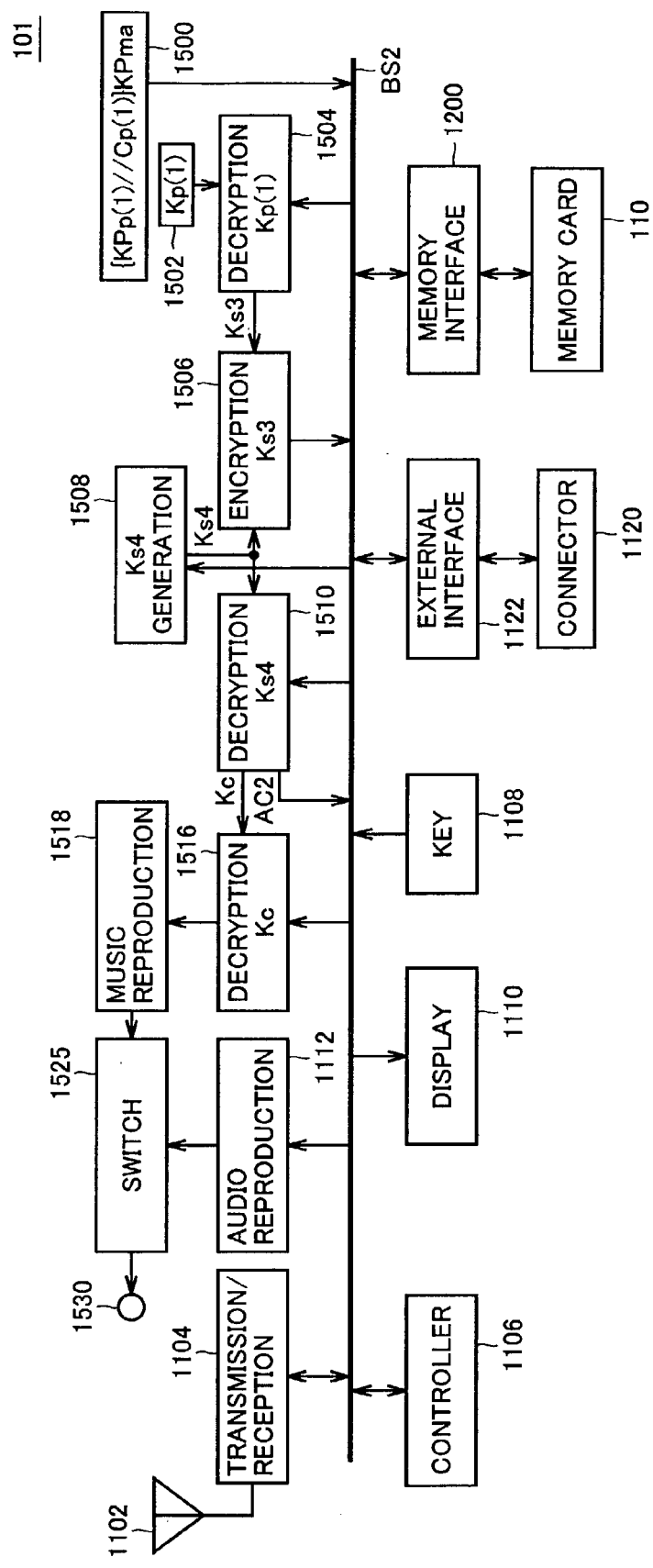
FIG. 14 is a schematic block diagram showing a configuration of a cellular phone in the data distribution system according to the second embodiment.

With reference to FIG. 14, cellular phone 101 is different in configuration from cellular phone 100 of the first embodiment in that the former excludes Kcom hold unit 1512 holding secret key Kcom shared by reproduction circuits and decryption unit 1514 using secret key Kcom.

More specifically, in cellular phone 101, corresponding to the fact that distribution server 31 does not provide encryption using secret key Kcom, encryption unit 1510 using session key Ks4 to effect decryption directly provides license key Kc, which is thus provided to decryption unit 1510 directly. The remaining circuit configurations and operations are similar to those of cellular phone 100 and thus will not be described.

Furthermore in the present embodiment the data distribution system uses a memory card identical in configuration to the FIG. 7 memory card 110.

Omitting the encryption using secret key Kcom shared by reproduction circuits results in a difference in operation in each of distribution, reproduction and transfer sessions, as will now be described with reference to a flow chart.

Figure 15:
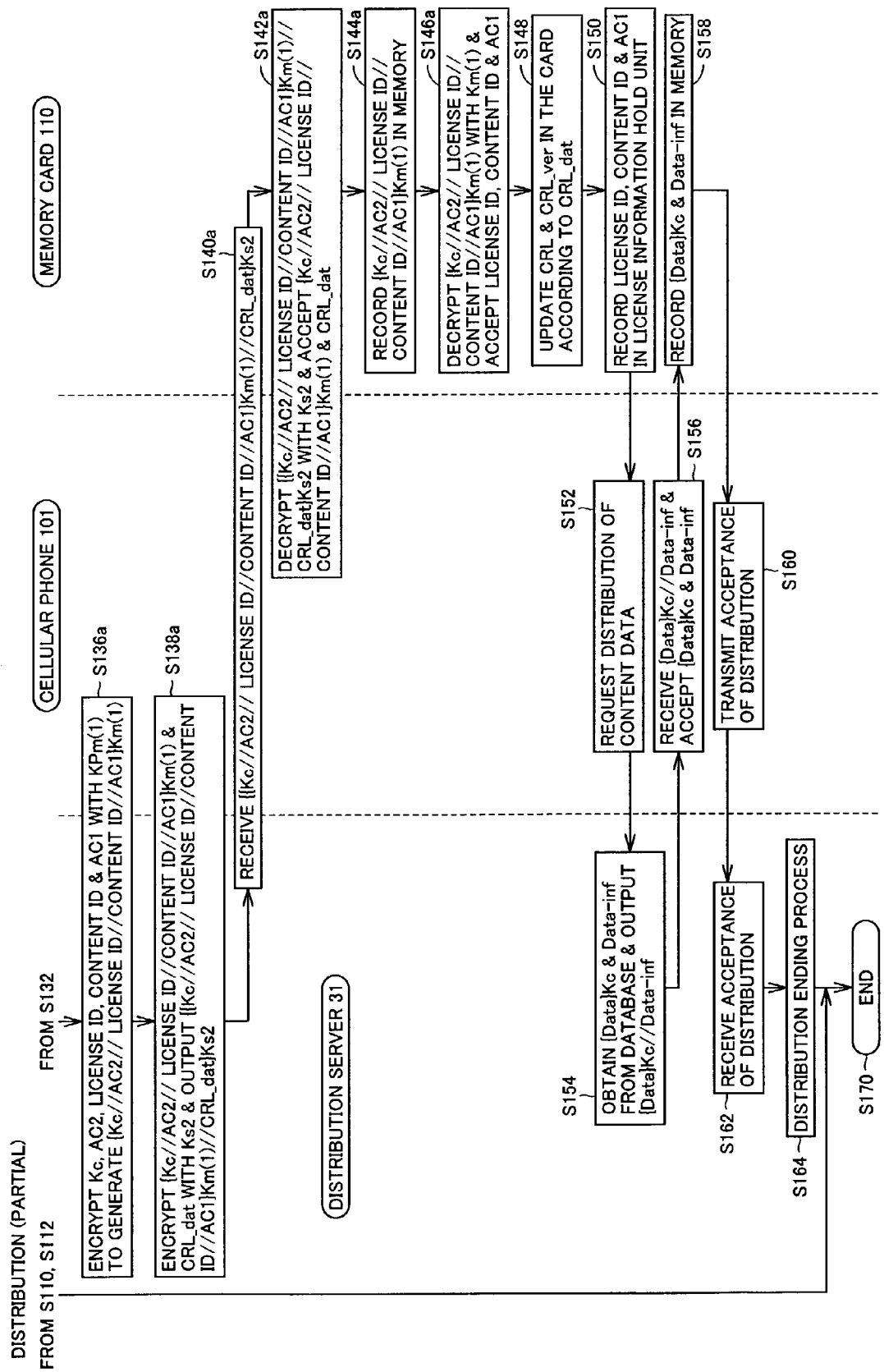
FIG. 15 is a flow chart for illustrating a distribution operation in the data distribution system according to the second embodiment.

FIG. 15 is a flow chart for illustrating a distribution operation in the data distribution system of the second embodiment. With reference to FIG. 15 a description will be made of a difference from the FIGS. 8 and 9 flow chart of the distribution operation in the data distribution system of the first embodiment.

With reference to FIG. 15, the process up to step S132 is identical to that in the FIG. 8 flow chart. As has been described with reference to FIG. 13, license key Kc and reproduction circuit control information AC2 obtained at step S132 are not encrypted with secret key Kcom and they are encrypted with public encryption key KPm(1) unique to memory card 110 and step S134 is thus eliminated. Hereinafter, step S132 is followed by steps S136a–S146a, rather than steps S136–S146.

Steps 136a–146a are different from steps S136–S146 in that license key Kc and reproduction control information AC2 operated in steps S136–S146 are changed from an encrypted form {Kc//AC2}Kcom to an exact form Kc//AC2 and thus used. The remaining encryption and decryption processes are similar to those having described with reference to FIG. 9 and thus will not be described.

Figure 16:
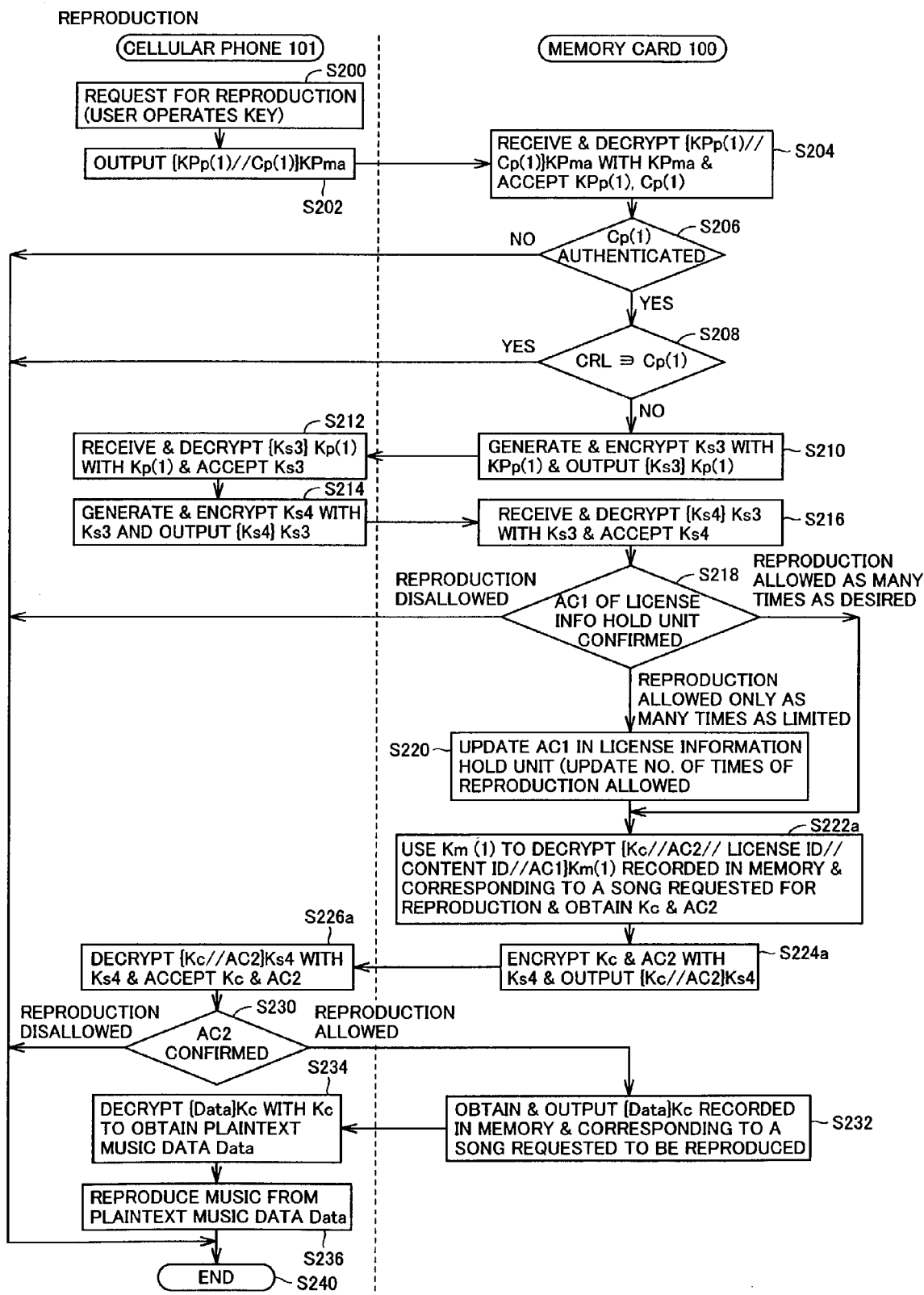
FIG. 16 is a flow chart for illustrating a reproduction operation in a cellular phone according to the second embodiment.

With reference to FIG. 16, the data distribution system of the second embodiment is different in reproduction operation from the FIG. 10 data distribution system of the first embodiment in that steps S222–S226 are replaced by steps S222a–S226a.

Steps S222a–S226a differ from steps S222–S226 in that license key Kc and reproduction control information AC2 are changed from an encrypted form {Kc//AC2}Kcom to an exact form Kc//AC2 and thus used. The remaining encryption and decryption processes are similar to those described with reference to FIG. 10 and thus will not be described. The remaining steps are also similar to those shown in FIG. 10 and thus will not be described.

Figure 17:
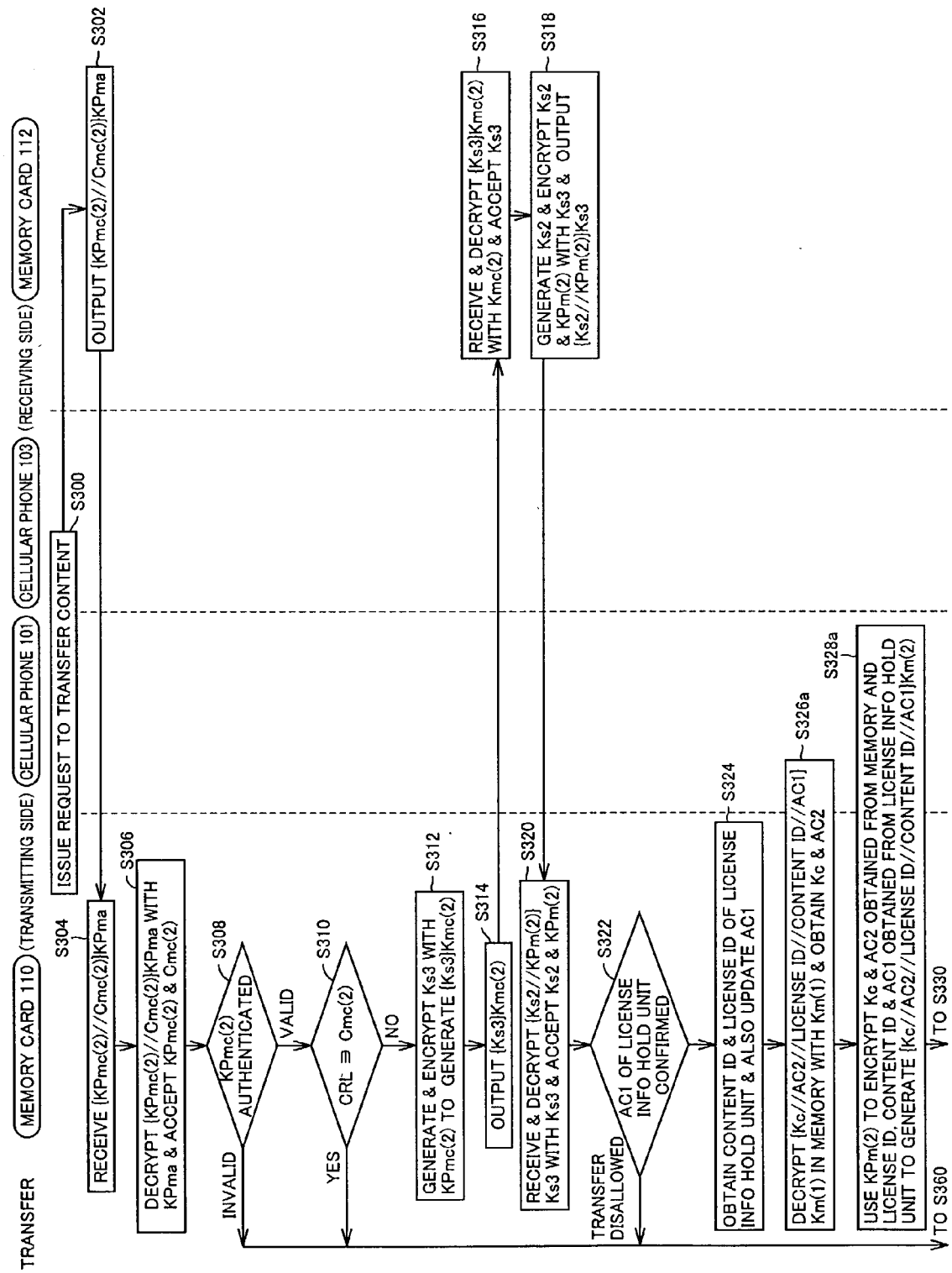
FIGS. 17 and 18 are first and second flow charts, respectively, for illustrating a transfer operation between two memory cards in the data distribution system of the second embodiment.
Figure 18:
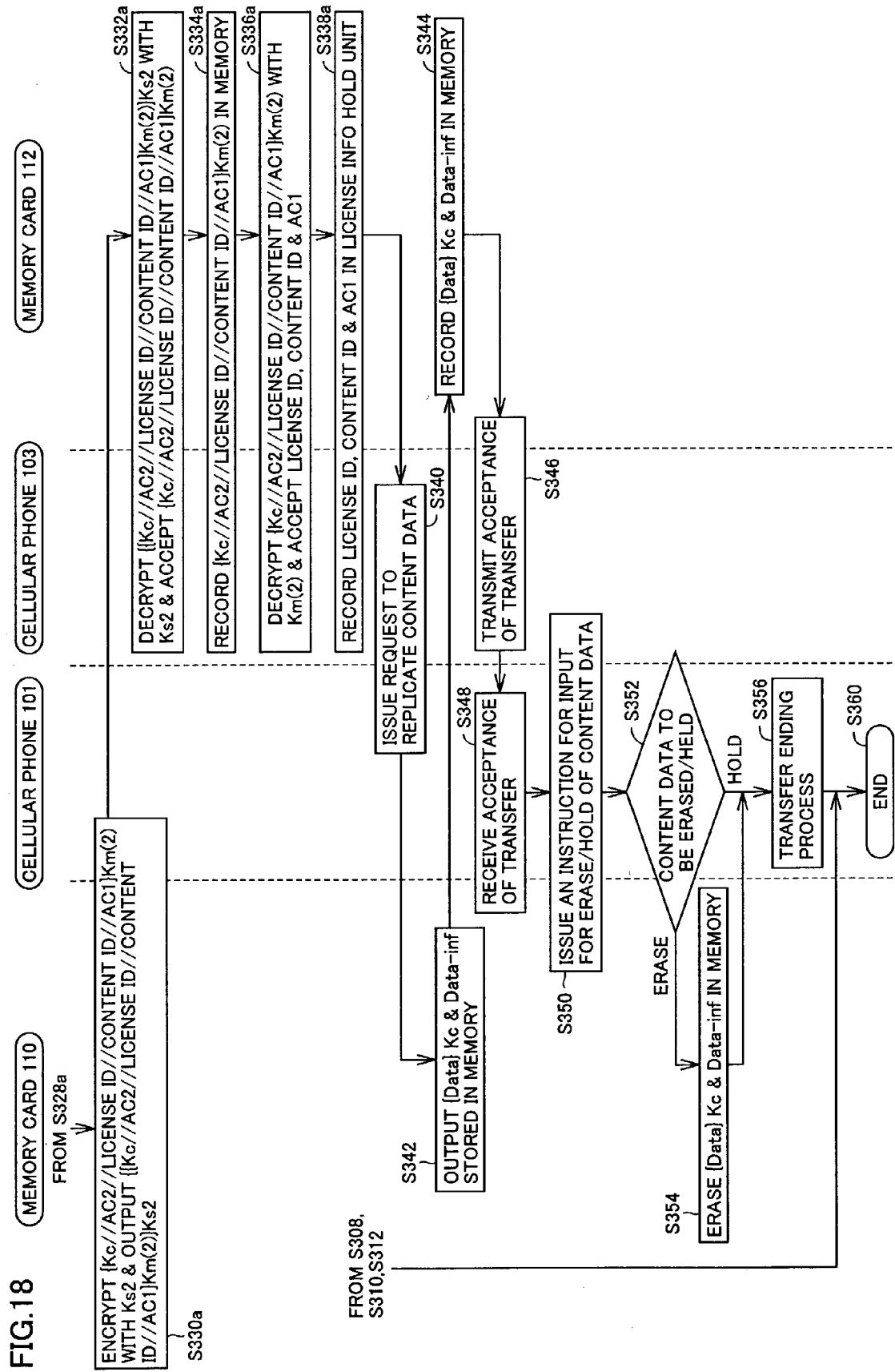

With reference to FIGS. 17 and 18, the data distribution system of the second embodiment in a transfer session is different in that the FIGS. 11 and 12 steps S326–S336 are replaced by steps S326a–S336a.

Steps S326a–S336a differ from steps S326–S336 in that license key Kc and reproduction circuit control information AC2 used in the latter steps are changed from an encrypted form {Kc//AC2}Kcom to an exact form Kc//AC2 and thus used. The remaining encryption and decryption processes are similar to those described with reference to FIGS. 11 and 12, and thus will not be described. The remaining steps are also similar to those shown in FIGS. 11 and 12 and thus will not be described.

Thus, if secret key Kcom shared by reproduction circuits is not used, a data distribution system can be configured to be as effective as that of the first embodiment.

Third Embodiment

For the memory card of the first embodiment the CRL data is held in a TRM region at a specific portion (CRL hold unit 1430 shown in FIG. 7). For a memory card of the third embodiment, the CRL data is also encrypted with an encryption key unique to the memory card and stored to a memory external to the TRM region as well as encrypted content data.

The third embodiment will be described with a memory card denoted by a reference numeral 115 and identified with natural number i=1 and natural number m=1.

Figure 19:
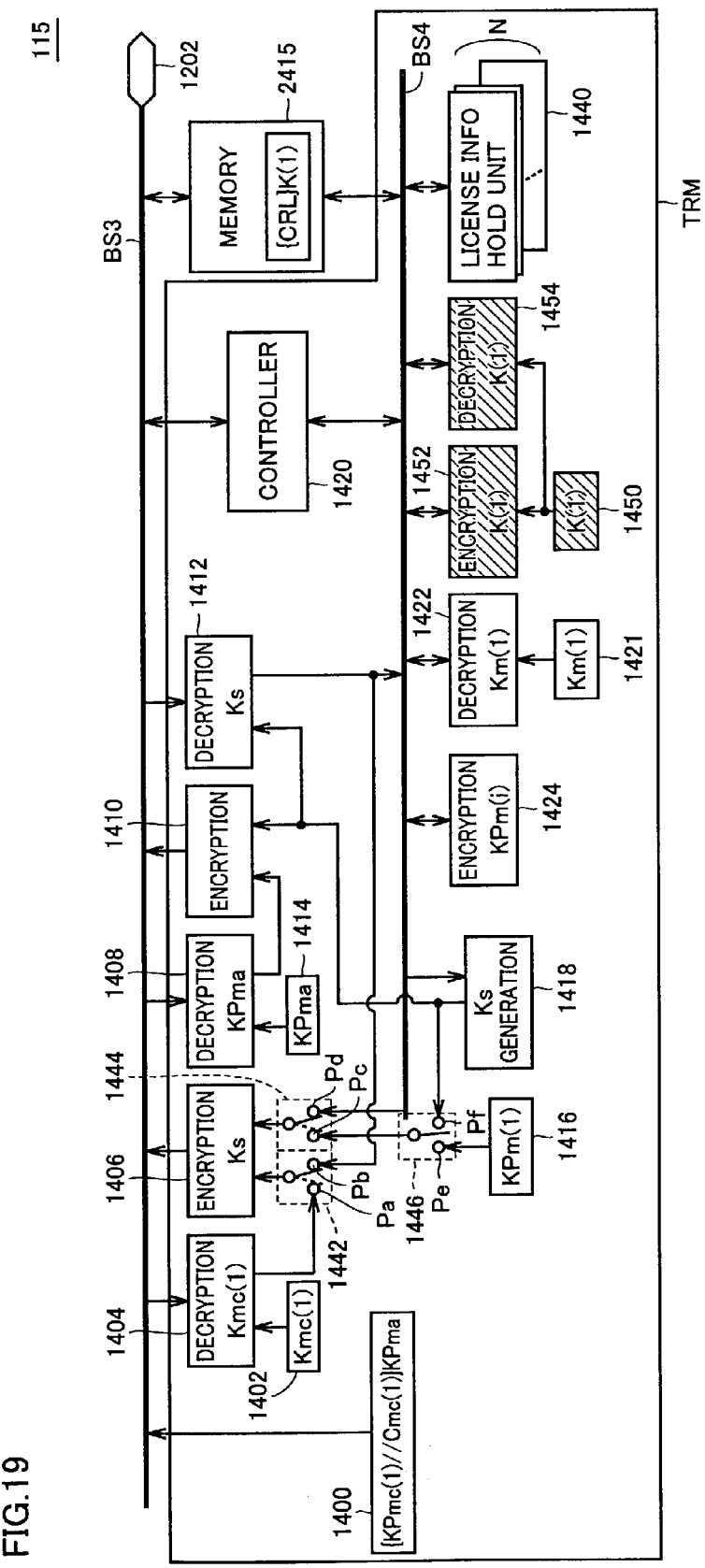
FIG. 19 is a schematic block diagram illustrating a configuration of a memory card according to a third embodiment.

With reference to FIG. 19, memory card 115 differs from the FIG. 7 memory card 110 of the first embodiment in that the former has a TRM region excluding CRL hold unit 1430. Furthermore memory card 115 further includes in the TRM region a K(1) hold unit 1450 holding symmetric key K(1) unique to each memory card, a symmetric key provided in a symmetric-key cryptosystem and prevented from reference outside from memory card 115, and encryption and decryption units 1452 and 1454 using symmetric key K(1).

With reference to FIG. 20 the distribution system of the third embodiment uses in addition to the key data and the like shown in FIG. 4 a symmetric key K(i) unique to each memory card. Symmetric key K(i) is a secret key used only in the memory card and it is a rapidly decryptable, symmetric key, and it thus differs from public encryption key KPm(i) and private decryption key Km(i), which are asymmetric, paired key similarly unique to each memory card.

Again with reference to FIG. 19, in memory card 115 CRL is encrypted with symmetric key K(1) and stored to memory 2415. Thus encrypting CRL with symmetric key K(1) allows the list to be stored to memory 2415 external to the TRM region.

Furthermore in memory card 110 the reproduction information including license key Kc that is encrypted with public encryption key KPm(1) can also be re-encrypted with symmetric key K(1) to reduce a processing-time taken in a reproduction session before reproduction starts, since decryption in a symmetric-key cryptosystem can be effected faster than that in a public-encryption cryptosystem. Furthermore, locking with a key differently, as described above, can also enhance the level of security.

Memory card 115 is used in a data distribution system to provide distribution, reproduction and transfer session operations, as will now be described with reference to a flow chart.

Figure 22:
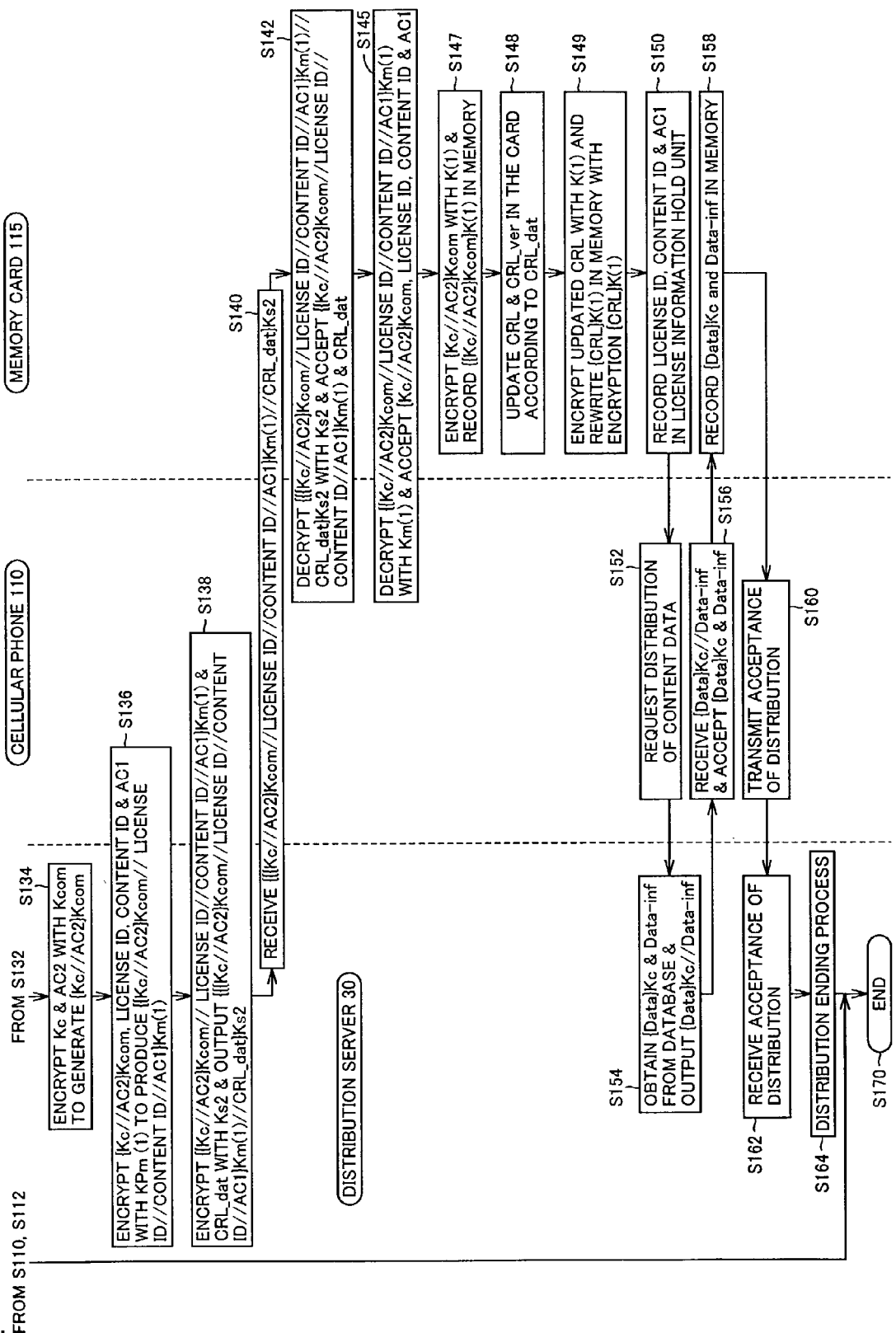

FIGS. 21 and 22 are a flow chart for illustrating a distribution operation in the data distribution system of the third embodiment. In the present embodiment the data distribution system in a distribution session operates to effect step S100 (the generation of a content distribution request through the acquisition of license key Kc in distribution server 30 from a database) through step S142, as has been described with reference to FIGS. 8 and 9.

With reference to FIG. 22, at step S142 are accepted reproduction information including an encrypted license key {{Kc//AC2}Kcom//license ID//content ID//AC1}Km(1) and differential data CRL_dat provided to update CRL, transmitted from distribution server 30.

In memory card 115 in a distribution session the FIG. 9 steps S144 and S146 are replaced by steps S145 and S147.

Initially in memory card 115 reproduction information including an encrypted license key is decrypted with Km(1), and {Kc//AC2}Kcom, a license ID, a content ID and AC1 are accepted (step S145).

Furthermore, a portion thereof, i.e., reproduction information {Kc//AC2}Kcom, which is not recorded in license information hold unit 1420 corresponding to a TRM region, is encrypted by encryption unit 1452 using symmetric key K(1) and it is thus recorded in memory 245 external to the TRM region (step S147).

At step S148, as well as in the first embodiment, class revocation list version updating information CRL_dat is referred to to update CRL in the card.

CRL data updated is encrypted similarly by encryption unit 1452 using K(1) and encrypted class revocation list {CRL}K(1) is stored to memory 2415 external to the TRM region (step S149).

Subsequent steps S150 through S164 indicating an end of a distribution process is similar to those described with reference to FIG. 9.

Figure 23:
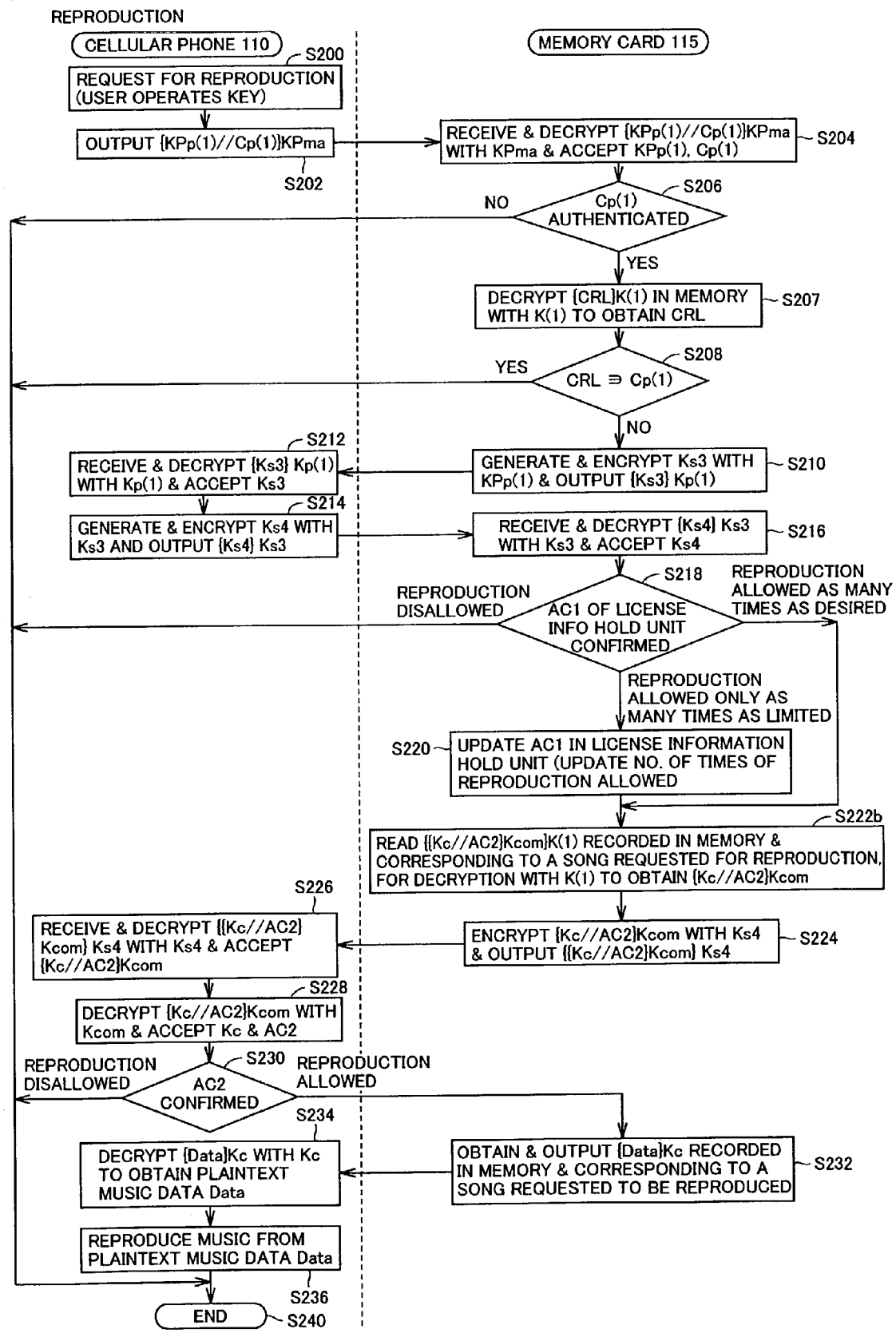
FIG. 23 is a flow chart for illustrating a reproduction operation of a cellular phone 110 in the data distribution system of the third embodiment.

With reference to FIG. 23, step S200, at which a reproduction request is generated, through step S206, at which a content reproduction circuit (a cellular phone) is authenticated, is similar to those described with reference to FIG. 10.

In memory card 115 CRL is encrypted and stored in memory 2415. As such, to check the class revocation list the encrypted class revocation list data needs to be decrypted and extracted.

If in memory card 115 an authentication process reveals that authentication data {KPp(1)//Cp(1)} is confirmed proper and class certificate Cp(1) is thus approved (step S206) then {CRL}K(1) recorded in memory is decrypted by decryption unit 1454 to obtain CRL (step S207). Controller 1420 refers to the obtained CRL to determine whether a content reproduction circuit has class certificate Cp(1) listed on the class revocation list (step S208).

If cellular phone 110 is not listed on CRL and reproduction is normally carried out, steps S210 through S220 are effected similarly as has been described with reference to FIG. 10.

In memory card 115, step S222 in memory card 110 as described in FIG. 10 is replaced by a step S222b. In step S222b, license key Kc and reproduction control information AC2 recorded in memory have been recorded in memory 2415 as {{Kc//AC2} Kcom}K(1) encrypted with symmetric key K(1) and the encrypted data is thus decrypted in decryption unit 1454 using symmetric key K(1) to obtain {Kc//AC2}Kcom.

Subsequent steps S224 through S240 are similar to those described with reference to FIG. 10.

Figure 24:
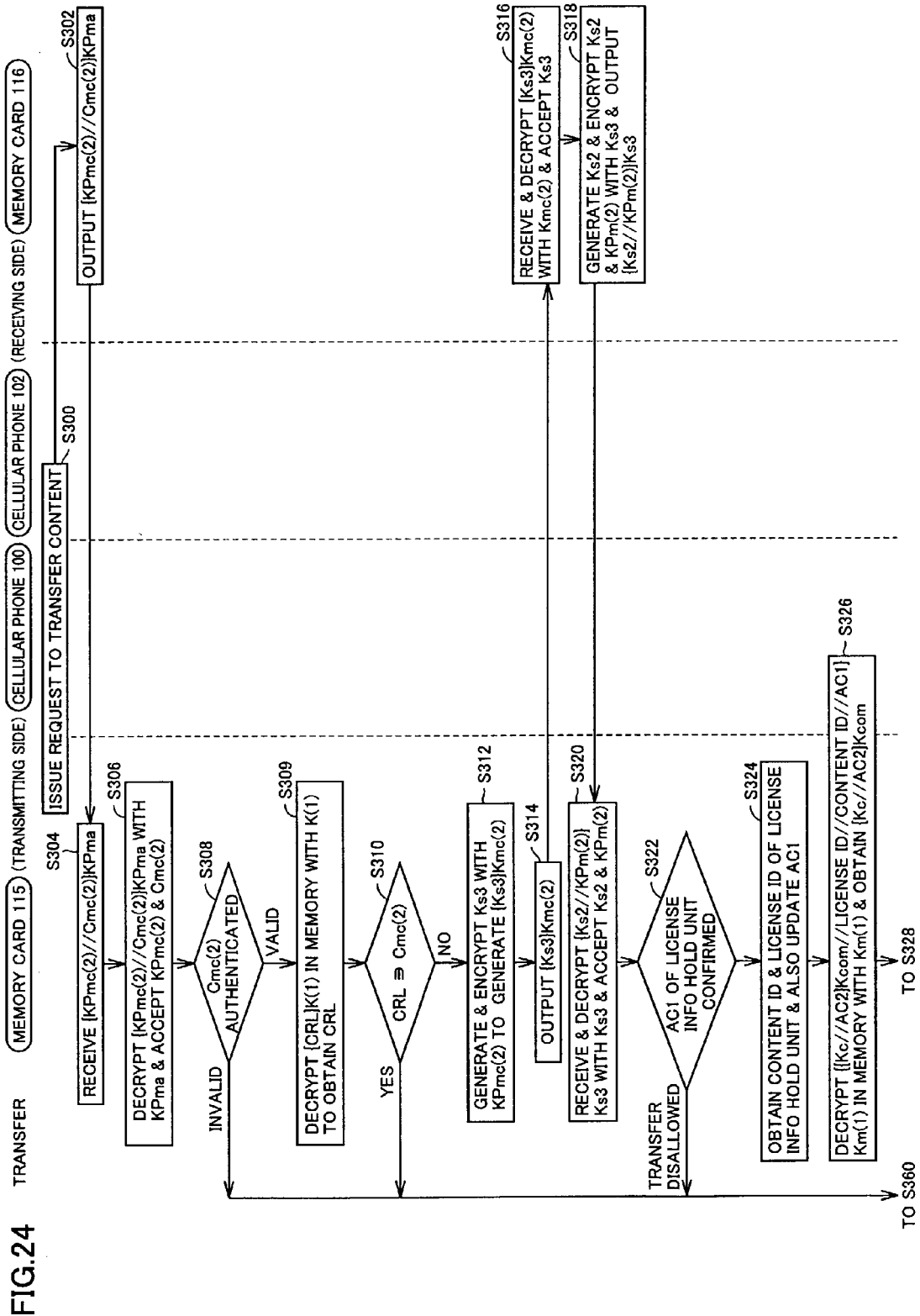
FIGS. 24 and 25 are first and second flow charts, respectively, illustrating a process of transferring data or the like between two memory cards of the third embodiment.
Figure 25:
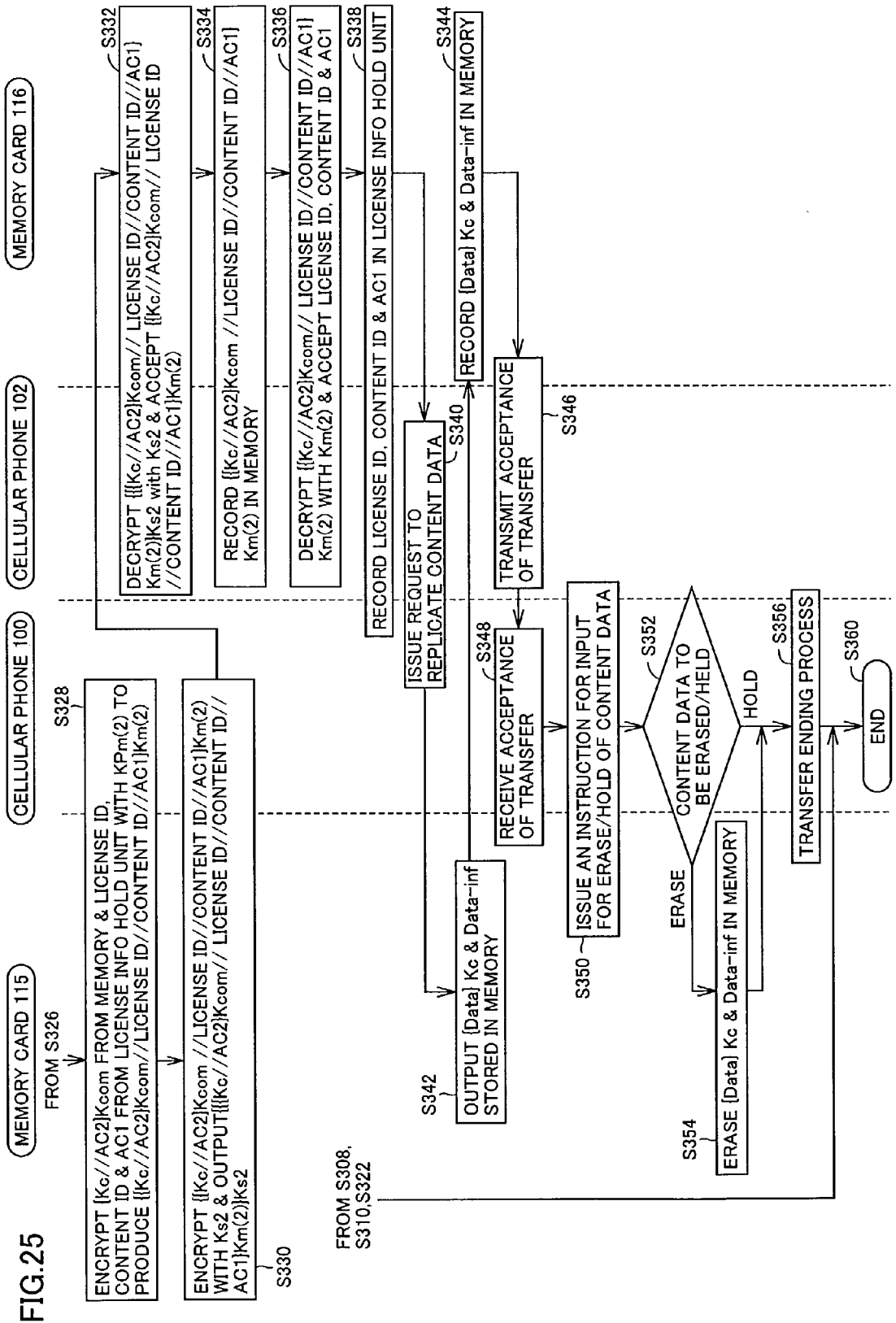

FIGS. 24 and 25 are a flow chart illustrating an operation of a data distribution system with memory card 115 in a transfer session.

In FIGS. 24 and 25, a transmitting side is cellular phone 100 and memory card 115 and a receiving side is cellular phone 102 and memory card 116 for the sake of illustration. As well as in FIGS. 11 and 12, natural number i=2 and natural number m=2 correspond to memory card 116 for the sake of illustration.

In the FIG. 24 flow chart, as compared with the FIG. 11 flow chart described in the first embodiment, if in memory card 115, as well as that in a reproduction session, the step S308 of authenticating KPmc (2) of the memory card reveals that the authentication is valid, then subsequently determining whether it is listed on a CRL requires recording encrypted data {CRL}K(1) of the CRL stored in memory 2415.

More specifically, if a result of the S308 authentication step is valid then controller 1420 reads encrypted CRL {CRL}K(1) from memory 2415, controls decryption unit 1454 to decrypt it to provide CRL (step S309).

With reference to obtained CRL, the control determines at step S310 whether the memory card has a class certificate listed on the CRL. The process following step S310 as shown in FIGS. 24 and 25 is similar to that as shown in FIGS. 11 and 12.

Thus it is no longer necessary to arrange in a TRM a portion storing data of CRL. Thus in addition to the effect of the data distribution system using the memory card of the first embodiment there is also provided another advantage that a memory card can be produced at reduced cost.

Furthermore, memory 2415 can store CRL data, license key Kc and reproduction control information AC2 all newly encrypted with symmetric key K(1), and the memory card's security can thus be enhanced and data can also be decrypted rapidly.

Note that if storing CRL data in memory region 2415 external to the TRM region is only desired, it can also be achieved by using public encryption key KPm(1) unique to the memory card, rather than symmetric key K(1), to encrypt CRL and store it to memory 2415 as {CRL}Km(1).

In all of the embodiments, when a data distribution system provides a distribution operation, distribution server 10 in an authentication process authenticates both of authentication data {KPmc(1)//Cmc(1)}KPma and {KPp(1)//Cp(1)}KPma of memory card 110 and cellular phone (content reproduction circuit) 100. However, a memory card is detachably attachable and it is not essential that a content reproduction circuit reproducing music be identical to a cellular phone having received a distribution. Furthermore in reproduction when also in a memory card a portion of reproduction information (license key Kc and reproduction circuit control information AC2) is to be output, an authentication process is provided for authentication data {KPp(1)//Cp(1)}KPma of a destination content reproduction circuit, and if the distribution server does not provide an authentication process for authentication data {KPp(1)//Cp(1)}KPma of the content reproduction circuit, security would not be impaired.

As such, the distribution server can dispense with an authentication process for {KPp(1)//Cp(1)}KPma of the content reproduction circuit and it may only provide an authentication process for authentication data {KPmc(1)//Cmc(1)}KPma of memory card 110 corresponding to a direct distribution destination.

The above can be implemented, as shown in FIG. 8 for the first and second embodiments and FIG. 21 for an embodiment with steps S104, S106, S108, S10 and S112 excluding all of the processings for the cellular phone (content reproduction circuit) 100 authentication data {KPp(1)}KPma, public encryption key KPp(1) and class certificate Cp(1).

Furthermore, at step S104, a content ID, the memory card 110 authentication data {KPma(1)//Cmc(1)}KPma and license purchasing condition AC are transmitted to the distribution server. At step S106, distribution server 10 receives the memory card 110 authentication data {KPma(1)//Cmc(1)}KPma and license purchasing condition AC. At step S108, authentication key KPma is used to decrypt authentication data {KPma(1)//Cmc(1)}KPma. Furthermore, at step S10, a result of decrypting the authentication data is based on to provide an authentication process and if the authentication data is found to come from a proper memory card then class certificate Cmc(1) is approved. If not then the distribution process ends.

At step S112, the control determines whether class certificate Cmc(1) approved is listed in CRL received from CRL database 306. If not, the distribution process continues. If so, the distribution process ends. In any subsequent step when such an authentication process is provided it can be effected as has been described in the first and second embodiments.

Furthermore in reproduction and transfer operations if such an authentication process is provided it can be provided according to a flow chart similar to that as has been described in the first and second embodiments.

Furthermore if in memory card 110 used in the first and second embodiments a sufficient TRM region can be ensured, having license hold unit 1440 store all of decrypted and thus plaintext reproduction information (license key Kc, reproduction circuit control information AC2, a license ID, a content ID and access restriction information AC1) does not impair security. A processing for memory card 110 is only changed and a similar effect still can be achieved.

To store to license hold unit 1440 all of the reproduction information in plaintext, the distribution, reproduction and transfer processes described in the first and second embodiments need to change their operation flows, as will now be described.

Such a case as described above can simply be accommodated, as follows: in the distribution process according to the first embodiment, the FIG. 9 step S144 is eliminated, at step S416 all of the reproduction information obtained through decryption (license key Kc, reproduction circuit control information AC2, a license ID, a content ID and access restriction information AC1) is received, and at step S150 all of the reproduction information received is recorded in license information hold unit 1440.

In the reproduction process according to the first embodiment the FIG. 10 step S220 is modified to obtain {Kc//AC2}Kcom recorded in the license information hold unit and corresponding to a song requested to be reproduced. The other steps in the reproduction process do not need to be changed.

The transfer process according to the first embodiment only requires a modification that at the FIG. 11 step S324 all of the reproduction information held in license information hold unit 1440 is obtained and that step S326 is eliminated. The other steps do not need to be changed.

Similarly the distribution process according to the second embodiment only requires a modification that the FIG. 15 step S144 is eliminated, at step S146a all of the reproduction information obtained through decryption (license key Kc, reproduction circuit control information AC2, a license ID, a content ID and access restriction information AC1) is accepted, and that at step S150 all of the reproduction information received is all recorded in license information hold unit 1440.

Furthermore the reproduction process according to the second embodiment only requires that the FIG. 16 step S222 is modified to obtain license key Kc and reproduction circuit control information AC2 recorded in license information hold unit 1440 and corresponding to a song requested to be reproduced. The other steps do not need to be changed in operation.

The transfer process according to the second embodiment only requires a modification that at the FIG. 17 step S324 all of the reproduction information held in license information hold unit 1440 is obtained and that step S326a is eliminated.

Thus, if reproduction information all in plaintext is held in license hold unit 1440, distribution, reproduction and transfer processes similar to those in the first and second embodiments can be applied.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

In accordance with the present invention a data distribution system and recording device can be used in data distribution employing a mobile communication terminal such as a cellular phone.

The invention claimed is:

1. A data distribution system comprising:
   a plurality of terminals; and
   a content provision device distributing encrypted content data and a license key to said plurality of terminals, said license key serving as a decryption key decrypting said encrypted content data to obtain plaintext content data, wherein:
   each said terminal includes
      a first interface unit provided to externally communicate data, and
      a distributed-data deciphering unit receiving and recording at least said license key therein;
   said deciphering unit has
      a first authentication data hold unit holding first class certification data determined to correspond to said deciphering unit, for output via said first interface unit when said license key is received, said first class certification data being encrypted in a state authenticatable through decryption using an authentication key, and
      a first storage unit provided to record said encrypted content data and said license key therein; and
   said content provision device includes
      a second interface unit provided to externally communicate data,
      a first authentication unit receiving from said second interface unit said first class certification data encrypted in a state capable of verifying authenticity through decryption using said authentication key, and decrypting said first class certification data with said authentication key to confirm said authenticity,
      a class revocation list hold unit holding a class revocation list listing said first class certification data subjected to revocation of said distribution, and
      a distribution control unit suspending at least a distribution operation distributing said content key to each said terminal having said deciphering unit, if said first authentication unit obtains said first class certification data listed on said class revocation list held in said class revocation list hold unit
   wherein said deciphering unit further has a second storage unit provided to hold said class revocation list, and a control unit operative in response to issuance of an instruction to effect said distribution operation, to extract update information capable of specifying an update of said class revocation list held in said second storage unit, for output via first interface unit to said content provision device;
   said content provision device provides said update information to said distribution control unit via said second interface unit; and
   said distribution control unit uses said update information to produce and output updating data via said second interface unit, said updating data being used to update said class revocation list in said second storage unit to provide a new class revocation list; and
   said control unit receives said updating data via said first interface unit and uses said updating data to update content of said class revocation list held in said second storage unit,
   wherein each said terminal further includes a content reproduction unit;
   said content reproduction unit has a content data reproduction unit receiving said license key and said encrypted content data from said deciphering unit and using said license key to decrypt and reproduce said encrypted content data, and a second authentication data hold unit holding second class certification data predetermined to correspond to said content reproduction unit and encrypted in a state capable of verifying said authenticity through decryption using said authentication key;
   said first authentication unit receives encrypted said second class certification data via said second interface unit for decryption;
   said class revocation list held in said class revocation list hold unit further lists said second class certification data subjected to revocation;
   in said distribution operation each said terminal outputs encrypted said second class certification data via said first interface unit to said second interface unit; and
   if said second class certification data input via said second interface unit and decrypted by said first authentication unit is listed on said class revocation list held in said class revocation list hold unit, said distribution control unit suspends at least said distribution operation distributing said license key to each said terminal.

2. The data distribution system of claim 1, wherein:
   said deciphering unit is a recording device detachably attached to said terminal; and
   said first class certification data is predetermined to correspond to each type of said recording device.

3. The data distribution system of claim 2, wherein said first memory is a semiconductor memory and said recording device is a memory card.

4. The data distribution system of claim 1, wherein:
   said deciphering unit further has a second authentication unit using said authentication key to effect decryption to confirm said authenticity;
   in a transfer operation effected in response to an external instruction to transfer or replicate into another distributed-data deciphering unit at least one of said encrypted content data and said license key, said deciphering unit obtains said first class certification data corresponding to said another deciphering unit and encrypted in a state capable of verifying said authenticity through decryption using said authentication key; and
   if said second authentication unit obtains said first class certification data corresponding to said another deciphering unit and listed on said class revocation list held in said second storage unit, said control unit suspends at least said transfer operation transferring said license key to said another deciphering unit.

5. A data distribution system, comprising:
   a plurality of terminals; and
   a content provision device distributing encrypted content data and a license key to said plurality of terminals, said license key serving as a decryption key decrypting said encrypted content data to obtain plaintext content data, wherein:
   each said terminal includes
      a first interface unit provided to externally communicate data, and
      a distributed-data deciphering unit receiving and recording at least said license key therein;

said deciphering unit has
a first authentication data hold unit holding first class certification data determined to correspond to said deciphering unit, for output via said first interface unit when said license key is received, said first class certification data being encrypted in a state authenticatable through decryption using an authentication key, and
a first storage unit provided to record said encrypted content data and said license key therein; and
said content provision device includes
a second interface unit provided to externally communicate data,
a first authentication unit receiving from said second interface unit said first class certification data encrypted in a state capable of verifying authenticity through decryption using said authentication key, and decrypting said first class certification data with said authentication key to confirm said authenticity,
a class revocation list hold unit holding a class revocation list listing said first class certification data subjected to revocation of said distribution, and
a distribution control unit suspending at least a distribution operation distributing said content key to each said terminal having said deciphering unit, if said first authentication unit obtains said first class certification data listed on said class revocation list held in said class revocation list hold unit
wherein said deciphering unit further has a second storage unit provided to hold said class revocation list, and a control unit operative in response to issuance of an instruction to effect said distribution operation, to extract update information capable of specifying an update of said class revocation list held in said second storage unit, for output via first interface unit to said content provision device;
said content provision device provides said update information to said distribution control unit via said second interface unit; and
said distribution control unit uses said update information to produce and output updating data via said second interface unit, said updating data being used to update said class revocation list in said second storage unit to provide a new class revocation list; and
said control unit receives said updating data via said first interface unit and uses said updating data to update content of said class revocation list held in said second storage unit,
wherein each said terminal further includes a content reproduction unit;
said content reproduction unit has a content data reproduction unit receiving said license key and said encrypted content data from said deciphering unit and using said license key to decrypt and reproduce said encrypted content data, and a second authentication data hold unit holding second class certification data predetermined to correspond to said content reproduction unit and encrypted in a state capable of verifying said authenticity through decryption using said authentication key;
said deciphering unit further has a second authentication unit using said authentication key to effect decryption to confirm said authenticity;
said class revocation list held in said second storage unit further lists said second class certification data subjected to revocation;

in a reproduction operation effected in response to an external instruction to reproduce said encrypted content in said content reproduction unit, said deciphering unit outputs said encrypted content data and license key stored in said first storage unit;
said deciphering unit in said reproduction operation obtains said second class certification data corresponding to said content reproduction unit and encrypted in a state capable of verifying said authenticity through decryption using said authentication key; and
said control unit at least suspends outputting said license key to said content reproduction unit, if in said reproduction operation said second authentication unit obtains said second class certification data listed on said class revocation list held in said second storage unit.

6. The data distribution system of claim 5, wherein:
said first interface unit and said second interface unit are connected together by a cellular phone network; and
said distribution control unit in said distribution operation uses said first class certification data to authenticate said deciphering unit.

7. The data distribution system of claim 6, wherein each said terminal further includes a communication processing unit connected to said cellular phone network to allow conversation.

8. The data distribution system of claim 5, wherein said content reproduction unit is detachably attached to said terminal.

9. A recording device comprising:
a first storage unit provided to record data therein;
an authentication unit receiving first class certification data provided from a destination of said data output via an interface unit and encrypted in a state authenticatable through decryption using an authentication key, and decrypting said first class certification data with said authentication key to confirm authenticity;
a second storage unit holding a class revocation list listing first class certification data subjected to revocation of output of said data; and
a control unit operative in response to an external instruction issued to output said data, to issue an instruction to output said data via said interface unit,
wherein said control unit suspends outputting said data to said destination having output said first class certification data received, if said class revocation list includes the first class certification data obtained from said authentication unit decrypting said encrypted first class certification data input externally via said interface unit together with said external instruction, and
further comprising an authentication data hold unit holding second class certification data determined to correspond to said recording device and encrypted in a state decryptable with said authentication key, wherein in a recording operation recording in said first storage unit said data input and received via said interface unit, in response to an external instruction issued to output second class certification data said authentication data hold unit outputs via said interface unit said second class certification data held in said authentication data hold unit,
wherein in said recording operation:
in response to issuance of an instruction to effect said recording operation, said control unit extracts update information capable of specifying an update of said class revocation list held in said second storage unit and externally outputs said update information via said interface unit; and said control unit externally receives, via said interface unit, updating data together with said data, said updating data being produced from said update information for updating said class revocation list to provide a new class revocation list, and said control unit refers to said updating data to update content of said class revocation list.

10. The recording device of claim 9, wherein said first storage unit is a semiconductor memory and said recording device is a memory card.

11. A data distribution system comprising:
a content provision device provided to distribute encrypted content data and a license key serving as a decryption key decrypting said encrypted content data to obtain plaintext content data; and
a plurality of terminals receiving the distribution from said content provision device, wherein:
said content provision device includes
 a first interface unit provided to externally communicate data,
 a first authentication unit receiving via said first interface unit first class certification data and a first public encryption key transmitted from each said terminal and encrypted in a state authenticatable through decryption using an authentication key, for decryption with said authentication key to confirm authenticity,
 a class revocation list hold unit holding a class revocation list listing said first class certification data subjected to revocation of distribution of said license key,
 a distribution control unit suspending a distribution operation distributing first reproduction information at least including said license key to a terminal corresponding to a source of said first class certification data received, if said first authentication unit obtains said first class certification data listed on said class revocation list held in said class revocation list hold unit,
 a first session key generation unit generating a first symmetric key updated whenever said distribution is effected,
 a session key encryption unit effecting an encryption process using said first public encryption key to encrypt said first symmetric key for transmission via said first interface unit to the terminal corresponding to the source of said first class certification data received,
 a session key decryption unit decrypting and extracting a second public encryption key and a second symmetric key encrypted with said first symmetric key and returned via said first interface unit from the terminal corresponding to the source of said first class certification data received,
 a first license data encryption unit encrypting said first reproduction information with said second public encryption key decrypted by said session key decryption unit, and
 a second license data encryption unit effecting an encryption process further encrypting an output of said first license data encryption unit with said second symmetric key decrypted by said session key decryption unit, for transmission via said first interface unit for distribution to the terminal corresponding to the source of said first class certification data received;
each said terminal includes
 a second interface unit provided to externally communicating data, and
 a distributed-data deciphering unit receiving and recording said encrypted content data therein;
 first class certification data and a first public encryption key are determined to correspond to said deciphering unit;
said deciphering unit has
 a first authentication data hold unit holding said first class certification data and first public encryption key encrypted in a state capable of verifying said authenticity through decryption using said authentication key, for output when said first reproduction information is received,
 a first key hold unit holding a first private decryption key decrypting data encrypted with said first public encryption key,
 a first decryption unit receiving said first symmetric key encrypted with said first public encryption key, for decryption,
 a second key hold unit holding said second public encryption key,
 a second session key generation unit producing said second symmetric key updated whenever said encrypted content data is communicated,
 a first encryption unit encrypting said second symmetric key and said second public encryption key with said first symmetric key for output to said second interface unit,
 a second decryption unit receiving encrypted said first reproduction information from said second license data encryption unit for decryption using said second symmetric key,
 a third key hold unit holding a second private decryption key decrypting data encrypted with said second public encryption key,
 a third decryption unit providing a decryption using said second private decryption key, and
 a first storage unit recording said first reproduction information and said encrypted content data therein,
wherein said deciphering unit further has
 a second storage unit holding said class revocation list, and
 a control unit operative in response to issuance of an instruction to effect a distribution operation to distribute said first reproduction information, to produce update information capable of specifying an update of said class revocation list held in said second storage unit;
said first encryption unit further encrypts said update information with said first symmetric key together with said second public encryption key and said second symmetric key for output to said second interface unit;
said distribution control unit produces updating data from said update information decrypted by said session key decryption unit, said updating data being used to update said class revocation list in said second storage unit to provide a new class revocation list;
said content provision device encrypts said updating data with said second symmetric key together with the first reproduction information encrypted with said second public encryption key, for transmission via said first interface unit to the terminal corresponding to the source of said first class certification data received;

said second decryption unit receives encrypted said updating data via said second interface unit for decryption with said second symmetric key; and said control unit uses said updating data to update content of said class revocation list held in said second storage units, wherein said deciphering unit is a recording device detachably attached to said terminal;

said first private decryption key varies for each type of said recording device; and each said terminal further includes a third interface having said deciphering unit attached thereto to communicate data with said deciphering unit, and wherein in a reproduction operation effected in response to an external instruction to reproduce said content data, said second session key generation unit is operative in response to said instruction to produce a third symmetric key;

said first storage unit is controlled by said control unit to be operative in response to said instruction issued to effect said reproduction operation, to output recorded said encrypted content data and said first reproduction information;

if in said reproduction operation said first storage unit outputs said first reproduction information encrypted, said third decryption unit effects decryption to extract said first reproduction information;

said first encryption unit in said reproduction operation receives said first reproduction information from one of said third decryption unit and said first storage unit for encryption with a fourth symmetric key;

said deciphering unit outputs said first reproduction information encrypted with said fourth symmetric key and said encrypted content data recorded in said first recording unit;

said data distribution system further comprises a plurality of reproduction terminals having said deciphering unit attached thereto to receive from said deciphering unit said first reproduction information encrypted with said fourth symmetric key and said encrypted content data which are output from said deciphering unit and reproduce content data from said first reproduction information and said encrypted content data;

each said reproduction terminal has a fourth interface having said deciphering unit attached thereto to communicate data with said deciphering unit, and a content reproduction unit;

said content reproduction unit has a fourth decryption unit decrypting said first reproduction information encrypted with said fourth symmetric key and output from said deciphering unit, to extract said first reproduction information, a content data reproduction unit decrypting said encrypted content data with said license key included in said first reproduction information corresponding to an output of said fourth decryption unit, for reproduction, a second authentication data hold unit holding a second class certification data and a third public encrypted key predetermined to correspond to said content reproduction unit and encrypted in a state capable of verifying authenticity through decryption using said authentication key, for output to said deciphering unit to accommodate said reproduction operation, a fourth key hold unit holding a third private decryption key decrypting data encrypted with said third public encryption key, a fifth decryption unit using said third private decryption key to decrypt data encrypted with said third public encryption key and returned, to obtain said third symmetric key, a third session key generation unit producing said fourth symmetric key updated whenever said reproduction operation is effected, and a second encryption unit using said third symmetric key received from said fifth decryption unit, to encrypt said fourth symmetric key for output to said deciphering unit; said deciphering unit further has a second authentication unit using said authentication key to decrypt said second class certification data and said third public encryption key encrypted in a state capable of verifying authenticity through decryption using said authentication key, to confirm said authenticity, and a third decryption unit controlled by said control unit to encrypt said second symmetric key with said third public encryption key received from said second authentication unit, for output to said content reproduction unit corresponding thereto;

said class revocation list further lists said second class certification data subjected to revocation; and said control unit suspends outputting said first reproduction information to said content reproduction unit, if in said reproduction operation said second authentication unit obtains said second class certification data listed in said class revocation list held in said second storage unit.

12. The data distribution system of claim 11, wherein:

said second and third decryption units receive via said second interface unit second reproduction information encrypted in said content provision device with said second public encryption key, further encrypted with said second symmetric key, and distributed together with said first reproduction information, for decryption with said second symmetric key and said second private decryption key; and said first storage unit further records said second reproduction information therein.

13. The data distribution system of claim 11, wherein said second storage unit is arranged in a security area unrewritable by a third party.

14. The data distribution system of claim 11, wherein:

said second and third decryption units receives via said second interface unit second reproduction information encrypted in said content provision device with said second public encryption key, further encrypted with said second symmetric key, and distributed together with said first reproduction information, for decryption with said second symmetric key and said second private decryption key;

said first storage unit, said deciphering unit further records therein said second reproduction information decrypted; and said control unit in said reproduction operation refers to said second reproduction information in said first storage unit to determine whether said first reproduction information may be output.

15. The data distribution system of claim 11, wherein:

in a transfer operation effected in response to an external instruction to transfer or replicate from said deciphering unit to another distributed-data deciphering unit data at least including said first reproduction information, said second authentication unit of said deciphering unit receives via said second interface unit said first class certification data and said first public encryption key corresponding to said another deciphering unit and encrypted in a state capable of verifying authenticity through decryption using said authentication key, for decryption with said authentication key to confirm said authenticity, and said second session key generation units of said deciphering unit and said another deciphering unit, respectively, also produce said third and second symmetric keys, respectively, to accommodate said transfer operation;

said third encryption unit of said deciphering unit in said transfer operation uses said first public encryption key corresponding to said another deciphering unit, to encrypt said third symmetric key corresponding to said deciphering unit, for output to said deciphering unit;

said second decryption unit of said another deciphering unit in said transfer operation decrypts data encrypted with said third symmetric key and returned from said deciphering unit, to obtain said second symmetric key produced in said deciphering unit and said second public encryption key corresponding to said deciphering unit;

said deciphering unit further has a fourth encryption unit further encrypting in said transfer operation said first reproduction information output from said first storage unit, with said second public encryption key corresponding to said another deciphering unit;

said first encryption unit of said deciphering unit in said transfer operation further encrypts said output of said fourth encryption unit with said second symmetric key produced by said another deciphering unit, for output to said another deciphering unit; and said control unit of said deciphering unit suspends said transfer operation if in said transfer operation said second authentication unit obtains said first class certification data corresponding to said another deciphering unit and listed in said class revocation list held in said second storage unit.

16. The data distribution system of claim 11, wherein:

said second and third decryption units receive via said second interface unit second reproduction information encrypted in said content provision device with said second public encryption key, further encrypted with said second symmetric key, and distributed together with said first reproduction information, for decryption with said second symmetric key and said second private decryption key;

said first storage unit further records therein said second reproduction information decrypted; and said control unit in said transfer operation refers to second reproduction information in said first storage unit to determine whether said transfer operation may be carried out and if said control unit determines that said transfer operation may be effected and said first reproduction information is output to said another deciphering unit said control unit updates said second reproduction information recorded in said first storage unit.

17. The data distribution system of claim 11, wherein:
said deciphering unit further has
a fifth key hold unit holding a secret key different for each said recording device,
a fifth encryption unit using said secret key to encrypt data obtained from said third decryption unit decrypting an output of said second decryption unit using said second private decryption key, and
a sixth decryption unit decrypting data encrypted with said secret key;

said first storage unit records therein data encrypted by said fifth encryption unit;

said fifth encryption unit encrypts data of said class revocation list with said secret key; and said second storage unit is arranged external to a security area unreadable by a third party and holds said class revocation list encrypted by said fifth encryption unit.

18. A recording device receiving and recording therein encrypted content data and first reproduction information including a license key serving as a decryption key decrypting said encrypted content data to obtain plaintext content data, comprising:

an interface unit externally communicating data;

a first storage unit recording said first reproduction information and said encrypted content data therein;

a second storage unit holding a class revocation list listing said first class certification data subjected to revocation of communicating said reproduction information;

a control unit operative, when said first reproduction information is received, to produce update information capable of specifying an update of said class revocation list held in said second storage;

an authentication data hold unit holding second class certification data and a first public encryption-key of a data recording device determined to correspond to said recording device and encrypted in a state capable of authenticatable through decryption using an authentication key, for external output via said interface unit when said first reproduction information is received;

a first key hold unit holding a first private decryption key decrypting data encrypted with said first public encryption key;

a first decryption unit receiving externally via said interface unit a first symmetric key encrypted with said first public encryption key, for decryption;

a second key hold unit holding a second public encryption key determined for each said recording device;

a session key generation unit producing a second symmetric key updated whenever said content data is communicated;

a first encryption unit encrypting said update information, said second symmetric key and said second public encryption key with said first symmetric key for external output via said interface unit;

a second decryption unit receiving, via said interface unit, said first reproduction information encrypted with said second public encryption key encrypted with said second symmetric key, and updating data based on said update information and input and used to update said class revocation list held in said second storage, for decryption with said second symmetric key;

a third key hold unit holding a second private decryption key decrypting data encrypted with said second public encryption key; and a third decryption unit using said second private decryption key to effect decryption, wherein said control unit refers to said updating data decrypted by said second decryption unit, to update content of said class revocation list held in said second storage, and further comprising an authentication unit operative in a reproduction operation effected in response to an external instruction issued to reproduce said content data, to receive via said interface unit said third class certification data corresponding to a reproduction circuit reproducing said content data, and encrypted with said authentication key, for decryption with said authentication key to confirm said authenticity, wherein said first class certification data includes said third class certification data; and said control unit suspends said reproduction operation if in said reproduction operation said authentication unit obtains said third class certification data corresponding to said content data reproduction circuit and listed on said class revocation list held in said second storage unit.

19. The recording device of claim 18, wherein:

in a transfer operation effected in response to an external instruction to transfer or replicate into another recording device data at least including said first reproduction information, said authentication unit receives via said interface unit second class certification data encrypted with said authentication key and corresponding to said another recording device, for decryption;

said first class certification data includes said second class certification data; and said control unit suspends said transfer operation if in said transfer operation said authentication unit obtains said second class certification data corresponding to said recording device and listed on said class revocation list held in said second storage unit.

20. A recording device receiving and recording therein encrypted content data and first reproduction information including a license key serving as a decryption key decrypting said encrypted content data to obtain plaintext content data, comprising:

an interface unit externally communicating data;

a first storage unit recording said first reproduction information and said encrypted content data therein;

a second storage unit holding a class revocation list listing said first class certification data subjected to revocation of communicating said reproduction information;

a control unit operative, when said first reproduction information is received, to produce update information capable of specifying an update of said class revocation list held in said second storage;

an authentication data hold unit holding second class certification data and a first public encryption-key of a data recording device determined to correspond to said recording device and encrypted in a state capable of authenticatable through decryption using an authentication key, for external output via said interface unit when said first reproduction information is received;

a first key hold unit holding a first private decryption key decrypting data encrypted with said first public encryption key;

a first decryption unit receiving externally via said interface unit a first symmetric key encrypted with said first public encryption key, for decryption;

a second key hold unit holding a second public encryption key determined for each said recording device;

a session key generation unit producing a second symmetric key updated whenever said content data is communicated;

a first encryption unit encrypting said update information, said second symmetric key and said second public encryption key with said first symmetric key for external output via said interface unit;

a second decryption unit receiving, via said interface unit, said first reproduction information encrypted with said second public encryption key encrypted with said second symmetric key, and updating data based on said update information and input and used to update said class revocation list held in said second storage, for decryption with said second symmetric key;

a third key hold unit holding a second private decryption key decrypting data encrypted with said second public encryption key; and a third decryption unit using said second private decryption key to effect decryption, wherein said control unit refers to said updating data decrypted by said second decryption unit, to update content of said class revocation list held in said second storage, and wherein said second storage unit is arranged internal to a security area unreadable by a third party.

21. A recording device receiving and recording therein encrypted content data and first reproduction information including a license key serving as a decryption key decrypting said encrypted content data to obtain plaintext content data, comprising:

an interface unit externally communicating data;

a first storage unit recording said first reproduction information and said encrypted content data therein;

a second storage unit holding a class revocation list listing said first class certification data subjected to revocation of communicating said reproduction information;

a control unit operative, when said first reproduction information is received, to produce update information capable of specifying an update of said class revocation list held in said second storage;

an authentication data hold unit holding second class certification data and a first public encryption-key of a data recording device determined to correspond to said recording device and encrypted in a state capable of authenticatable through decryption using an authentication key, for external output via said interface unit when said first reproduction information is received;

a first key hold unit holding a first private decryption key decrypting data encrypted with said first public encryption key;

a first decryption unit receiving externally via said interface unit a first symmetric key encrypted with said first public encryption key, for decryption;

a second key hold unit holding a second public encryption key determined for each said recording device;

a session key generation unit producing a second symmetric key updated whenever said content data is communicated;

a first encryption unit encrypting said update information, said second symmetric key and said second public encryption key with said first symmetric key for external output via said interface unit;

a second decryption unit receiving, via said interface unit, said first reproduction information encrypted with said second public encryption key encrypted with said second symmetric key, and updating data based on said update information and input and used to update said class revocation list held in said second storage, for decryption with said second symmetric key;

a third key hold unit holding a second private decryption key decrypting data encrypted with said second public encryption key; and a third decryption unit using said second private decryption key to effect decryption, wherein said control unit refers to said updating data decrypted by said second decryption unit, to update content of said class revocation list held in said second storage, and further comprising a second encryption unit encrypting data of said class revocation list with said second public encryption key, wherein said second storage unit is arranged external to a security area unreadable by a third party and holds said class revocation list encrypted by said second encryption unit.

22. A recording device receiving and recording therein encrypted content data and first reproduction information including a license key serving as a decryption key decrypting said encrypted content data to obtain plaintext content data, comprising:

an interface unit externally communicating data;

a first storage unit recording said first reproduction information and said encrypted content data therein;

a second storage unit holding a class revocation list listing said first class certification data subjected to revocation of communicating said reproduction information;

a control unit operative, when said first reproduction information is received, to produce update information capable of specifying an update of said class revocation list held in said second storage;

an authentication data hold unit holding second class certification data and a first public encryption-key of a data recording device determined to correspond to said recording device and encrypted in a state capable of authenticatable through decryption using an authentication key, for external output via said interface unit when said first reproduction information is received;

a first key hold unit holding a first private decryption key decrypting data encrypted with said first public encryption key;

a first decryption unit receiving externally via said interface unit a first symmetric key encrypted with said first public encryption key, for decryption;

a second key hold unit holding a second public encryption key determined for each said recording device;

a session key generation unit producing a second symmetric key updated whenever said content data is communicated;

a first encryption unit encrypting said update information, said second symmetric key and said second public encryption key with said first symmetric key for external output via said interface unit;

a second decryption unit receiving, via said interface unit, said first reproduction information encrypted with said second public encryption key encrypted with said second symmetric key, and updating data based on said update information and input and used to update said class revocation list held in said second storage, for decryption with said second symmetric key;

a third key hold unit holding a second private decryption key decrypting data encrypted with said second public encryption key; and a third decryption unit using said second private decryption key to effect decryption, wherein said control unit refers to said updating data decrypted by said second decryption unit, to update content of said class revocation list held in said second storage, and further comprising:

a secret key hold unit holding a secret key different for each said recording device;

a secret key encryption unit using said secret key to effect encryption; and a secret key decryption unit decrypting data encrypted with said secret key, wherein:

said first storage unit and said second storage unit are arranged external to a security area unreadable by a third party;

said first storage unit holds data encrypted by said second encryption unit; and said second storage unit holds said class revocation list encrypted by said second encryption unit.

23. A recording device device receiving and recording therein encrypted content data and first reproduction information including a license key serving as a decryption key decrypting said encrypted content data to obtain plaintext content data, comprising:

an interface unit externally communicating data;

a first storage unit recording said first reproduction information and said encrypted content data therein;

a second storage unit holding a class revocation list listing said first class certification data subjected to revocation of communicating said reproduction information;

a control unit operative, when said first reproduction information is received, to produce update information capable of specifying an update of said class revocation list held in said second storage;

an authentication data hold unit holding second class certification data and a first public encryption-key of a data recording device determined to correspond to said recording device and encrypted in a state capable of authenticatable through decryption using an authentication key, for external output via said interface unit when said first reproduction information is received;

a first key hold unit holding a first private decryption key decrypting data encrypted with said first public encryption key;

a first decryption unit receiving externally via said interface unit a first symmetric key encrypted with said first public encryption key, for decryption;

a second key hold unit holding a second public encryption key determined for each said recording device;

a session key generation unit producing a second symmetric key updated whenever said content data is communicated;

a first encryption unit encrypting said update information, said second symmetric key and said second public encryption key with said first symmetric key for external output via said interface unit;

a second decryption unit receiving, via said interface unit, said first reproduction information encrypted with said second public encryption key encrypted with said second symmetric key, and updating data based on said update information and input and used to update said class revocation list held in said second storage, for decryption with said second symmetric key;

a third key hold unit holding a second private decryption key decrypting data encrypted with said second public encryption key; and a third decryption unit using said second private decryption key to effect decryption, wherein said control unit refers to said updating data decrypted by said second decryption unit, to update content of said class revocation list held in said second storage, and wherein said first storage unit is a semiconductor memory and said recording device is a memory card.

* * * * *